(12) United States Patent
Ryu et al.

(10) Patent No.: US 10,592,467 B2
(45) Date of Patent: Mar. 17, 2020

(54) SEMICONDUCTOR MEMORY DEVICE AND METHOD OF OPERATING A SEMICONDUCTOR DEVICE IN A PROCESSOR MODE OR A NORMAL MODE

(71) Applicant: Samsung Electronics Co., Ltd., Suwon-si (KR)

(72) Inventors: Je Min Ryu, Seoul (KR); Reum Oh, Hwaseong-si (KR); Hak-Soo Yu, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/493,292

(22) Filed: Apr. 21, 2017

(65) Prior Publication Data

US 2017/0344301 A1 Nov. 30, 2017

(30) Foreign Application Priority Data

May 30, 2016 (KR) .................. 10-2016-0066477

(51) Int. Cl.
*G06F 3/06* (2006.01)
*G06F 15/78* (2006.01)

(52) U.S. Cl.
CPC .................................. *G06F 15/785* (2013.01)

(58) Field of Classification Search
CPC ........ G06F 12/00; G06F 3/0604; G06F 3/061; G06F 3/0659; G06F 3/0673; G06F 9/30007; G06F 9/3004; G06F 15/785
See application file for complete search history.

(56) References Cited

U.S. PATENT DOCUMENTS

| | | | |
|---|---|---|---|
| 5,396,641 A * | 3/1995 | Iobst | G06F 7/509 700/2 |
| 7,155,581 B2 | 12/2006 | Elliott et al. | |
| 8,922,243 B2 * | 12/2014 | Jayasena | H03K 19/1776 326/39 |
| 8,971,124 B1 | 3/2015 | Manning | |
| 9,477,636 B2 | 10/2016 | Walker et al. | |
| 9,959,929 B2 * | 5/2018 | Resnick | G11C 7/1006 |
| 2002/0059392 A1 * | 5/2002 | Ellis, III | A01N 25/30 709/208 |
| 2002/0114178 A1 * | 8/2002 | Sakui | G06F 13/4234 365/51 |
| 2010/0313000 A1 | 12/2010 | Walker | |
| 2011/0093662 A1 | 4/2011 | Walker et al. | |

(Continued)

*Primary Examiner* — Larry T Mackall
(74) *Attorney, Agent, or Firm* — Muir Patent Law, PLLC

(57) ABSTRACT

An operation method of a semiconductor memory device including a memory cell array and an internal processor configured to perform an internal processing operation includes receiving at the memory device a first mode indicator that indicates whether the memory device should operate in a processor mode or in a normal mode, receiving at the memory device processing information for the memory device, when the first mode indicator indicates that the memory device should operate in the processor mode, storing the processing information in a first memory cell region of the memory cell array, using the stored processing information to perform internal processing by the internal processor, and storing a result of the internal processing in the memory cell array.

12 Claims, 22 Drawing Sheets

(56) References Cited

U.S. PATENT DOCUMENTS

| | | |
|---|---|---|
| 2012/0246380 A1 | 9/2012 | Akerib et al. |
| 2012/0246401 A1 | 9/2012 | Agam et al. |
| 2013/0262612 A1* | 10/2013 | Langas ................. G06F 3/0605 709/211 |
| 2015/0046660 A1 | 2/2015 | Kim |
| 2015/0286529 A1 | 10/2015 | Lunde |
| 2017/0255390 A1* | 9/2017 | Chang ................... G06F 3/0605 |

* cited by examiner

SEMICONDUCTOR MEMORY DEVICE AND METHOD OF OPERATING A SEMICONDUCTOR DEVICE IN A PROCESSOR MODE OR A NORMAL MODE

CROSS-REFERENCE TO RELATED APPLICATIONS

This U.S. non-provisional patent application claims priority under 35 U.S.C. § 119 to Korean Patent Application No. 10-2016-0066477, filed on May 30, 2016, the entirety of which is hereby incorporated by reference.

BACKGROUND

Example embodiments of the present disclosure relate generally to semiconductor memories and, more particularly, to semiconductor memory devices and operation methods thereof.

Semiconductor memory devices are typically implemented using semiconductors such as silicon (Si), germanium (Ge), gallium arsenide (GaAs), and indium phosphide (InP). In general, semiconductor memory devices are classified into volatile memory devices and nonvolatile memory devices.

Since a DRAM has high response speed and high operation speed, the DRAM has been widely used in the main memory of systems. A typical DRAM writes data or outputs written data according to control of a host. In recent years, there has been development of DRAM devices including an internal processor that performs a part of an arithmetic operation of a host (or CPU) as internal processing. A burden associated with the arithmetic operation of the host is reduced through the internal processing. Thus, the entire performance may be improved. However, a separate interface is typically required for the internal process, which causes the costs of a device for implementing the internal processing to increase.

SUMMARY

The present disclosure relates to a semiconductor memory device with improved performance and reduced cost and an operation method thereof.

Example embodiments provide an operation method of a semiconductor memory device including a memory cell array and an internal processor configured to perform an internal processing operation. The method includes receiving at the memory device a first mode indicator that indicates whether the memory device should operate in a processor mode or in a normal mode, receiving at the memory device processing information for the memory device, when the first mode indicator indicates that the memory device should operate in the processor mode, storing the processing information in a first memory cell region of the memory cell array, using the stored processing information to perform internal processing by the internal processor, and storing a result of the internal processing in the memory cell array.

In some embodiments, the method includes receiving at the memory device a first mode indicator that indicates whether the memory device should operate in a processor mode or in a normal mode; receiving at the memory device processing information for the memory device; when the first indicator indicates that the memory device should operate in the processor mode, storing the processing information in a first memory region of the memory cell array, the first memory region being a redundant memory cell region receiving at the memory device a second mode indicator that indicates whether the memory device should operate in a processor mode or in a normal mode; receiving at the memory device a data signal that includes data; and when the second mode indicator indicates that the memory device should operate in the normal mode, storing the data from the data signal in a second memory region of the memory cell array, the second memory cell region being a normal memory cell region.

In some embodiments, the method includes receiving at the memory device a first mode indicator that indicates whether the memory device should operate in a processor mode or in a normal mode; receiving and storing at a first region of the memory device processing information for the memory device, the first region being a memory cell region and the processing information received from a separate, second region of the memory device using the stored processing information to perform internal processing by the internal processor; and storing a result of the internal processing in the memory cell array.

BRIEF DESCRIPTION OF THE DRAWINGS

The forgoing and other features of inventive concepts will be described below in more detail with reference to the accompanying drawings of non-limiting example embodiments of inventive concepts in which like reference characters refer to like parts throughout the different views. The drawings are not necessarily to scale, emphasis instead being placed upon illustrating principles of inventive concepts. In the drawings.

DETAILED DESCRIPTION

Figure 1:
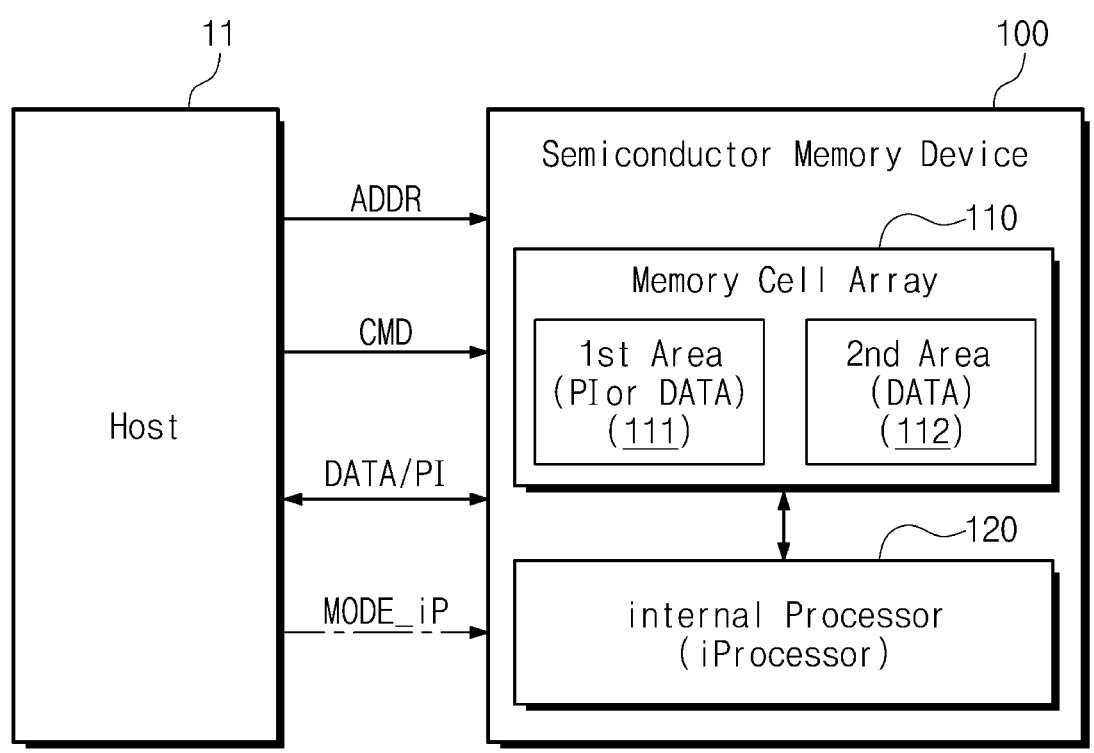
FIG. 1 is a block diagram of a user system according to example embodiments.

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of layers and regions may be exaggerated for clarity. Like numbers refer to like elements throughout. Though the different figures show variations of exemplary embodiments, and may be referred to using language such as "in one embodiment," these figures are not necessarily intended to be mutually exclusive from each other. Rather, as will be seen from the context of the detailed description below, certain features depicted and described in different figures can be combined with other features from other figures to result in various embodiments, when taking the figures and their description as a whole into consideration.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present. Other words used to describe the relationship between elements should be interpreted in a like fashion (e.g., "between" versus "directly between," "adjacent" versus "directly adjacent," etc.).

Schematic and block diagrams used herein which do not explicitly describe a physical structure are not necessarily intended to limit the invention to a particular structure.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to emphasize this meaning, unless the context or other statements indicate otherwise. For example, items described as "substantially the same," "substantially equal," or "substantially planar," may be exactly the same, equal, or planar, or may be the same, equal, or planar within acceptable variations that may occur, for example, due to manufacturing processes.

As used herein, items described as being "electrically connected" are configured such that an electrical signal can be passed from one item to the other. Therefore, a passive electrically conductive component (e.g., a wire, pad, internal electrical line, etc.) physically connected to a passive electrically insulative component (e.g., a prepreg layer of a printed circuit board, an electrically insulative adhesive connecting two device, an electrically insulative underfill or mold layer, etc.) is not electrically connected to that component. Moreover, items that are "directly electrically connected," to each other are electrically connected through one or more passive elements, such as, for example, wires, pads, internal electrical lines, through vias, etc. As such, directly electrically connected components do not include components electrically connected through active elements, such as transistors or diodes. Directly electrically connected elements may be directly physically connected and directly electrically connected.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

A semiconductor memory device according to example embodiments of inventive concepts may operate in one of operation modes which include a normal mode in which a normal data transaction is performed and an internal processing mode in which an internal processing operation is performed. The semiconductor memory device includes an internal processor (iProcessor) that performs an internal processing operation. The internal processor may perform an internal processing operation based on processing information PI stored in the semiconductor memory device in an internal processing mode. As the internal processing operation is performed in the semiconductor memory device, a burden associated with an arithmetic operation of a host may be reduced. Moreover, an access to the processing information PI may be similar to an access operation in a normal mode. Thus, interface variation for supporting the internal processing mode may be minimized to improve performance of a semiconductor memory device and to reduce the costs of the semiconductor memory device.

FIG. 1 is a block diagram of a user system 10 according to example embodiments. Referring to FIG. 1, the user system 10 may include a host 11 and a semiconductor memory device 100. In example embodiments, the user system 10 may be a computing system such as a computer, a laptop computer, a server, a workstation, a mobile communication terminal, a personal digital assistant (PDA), a portable multimedia player (PMP), a smartphone, and a wearable device. Alternatively, the user system 10 may be a part of components included in a computing system, such as a graphic card.

The host 11 may access the semiconductor device 100 for data storage or retrieval—e.g., may write data DATA into the semiconductor memory device 100 or may read data DATA written into the semiconductor memory device 100. For example, the host 11 may provide an address ADDR and a command CMD to the semiconductor memory device 100 to write data DATA into the semiconductor memory device 100 or to read data DATA written into the semiconductor memory device 100. In example embodiments, the host 11 may include a memory controller (not shown) to control the semiconductor memory device 100. In example embodiments, the host 11 may be an external processor such as CPU and GPU.

The semiconductor memory device 100 may write or output data DATA under the control of the host 11. In example embodiments, the semiconductor memory device 100 may be a DRAM. However, inventive concepts are not limited thereto, and the semiconductor memory device 100 may be one of semiconductor memory devices such as a static RAM (SRAM), a dynamic RAM (DRAM), a synchronous DRAM (SDRAM), a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), and a ferroelectric RAM (FRAM).

The semiconductor memory device 100 may include a memory cell array 110 and an internal processor (iProcessor) 120. For example, the semiconductor memory device 100 may be in the form of a processor-in-memory (PIM). The semiconductor memory device 100 may perform a transaction or an internal processing operation under the control of the host 11. The semiconductor device 100 may be in the form of a semiconductor chip (e.g., a die formed from a wafer), or may be a semiconductor package including one or more semiconductor chips mounted on a package substrate and covered with a molding layer. In one embodiment where the semiconductor device 100 is a semiconductor chip, part of the chip includes a processor integrated circuit and another part of the chip includes a memory cell array integrated circuit.

The memory cell array 110 may include a first area, or region, 111 and a second area, or region, 112. The first area 111 may store processing information PI or data DATA under the control of the host 11, and the second area 112 may store data DATA under the control of the host 11. In example embodiments, the first and second areas 111 and 112 may be logically or physically divided areas. In example embodiments, the first area 111 may include spare cell or redundancy cells. In example embodiments, the processing information PI may be information for the internal processing operation performed by the internal processor 120. The processing information PI may include information such as an internal processing operation command and internal processing data.

The internal processor 120 may perform an internal processing operation under the control of the host 11. For example, the internal processor 120 may perform an internal processing operation based on the processing information PI written into the first area 111. For example, the first area or region 111 of a memory cell array can store processing information PI about how data should be processed (e.g., instructions, or other information used to control processing), and that processing information PI is then used to perform internal processing within the semiconductor memory device 100, and more particularly, within the memory cell array 110. In example embodiments, the internal processing operation may indicate a processing operation on data DATA stored in the memory cell array 110, such as data search, data add, data move, data compare, data swap, and data process/calculation.

In example embodiments, the semiconductor memory device 100 may operate in one of at least two different operation modes which include a normal mode and an internal processing mode. The normal mode may indicate an operation mode in which a normal data transaction, such as a read or write operation, is performed. The internal processing mode MODE_iP may indicate an operation mode in which an internal processing operation is performed, not the normal data transaction of the semiconductor memory device 100.

For example, in the normal mode, the semiconductor memory device 100 may perform a normal data transaction under the control of the host 11. The normal data transaction indicates, for example, a data exchange operation performed according to a predetermined data protocol such as a double data rate (DDR) protocol.

In the internal processing mode, the semiconductor memory device 100 may perform an internal processing operation. For example, the internal processor 120 may perform an internal processing operation under the control of the host 11. For example, the host 11 may activate (or transmit) a specific signal such that the semiconductor memory device 100 enters the internal processing mode MODE_iP. Hereinafter, for brevity of the drawing and ease of description, a configuration of entering the internal processing mode MODE_iP will be shown by a broken line. This configuration is not limited to a configuration of providing the specific signal from the host 11 to the semiconductor memory device 100. It is to be understood that this configuration may simply indicate entry into the internal processing mode MODE_iP of the semiconductor memory device 100. In addition, the semiconductor memory device 100 may enter the internal processing mode MODE_iP under the control of the host 11, which results in activation of the internal processing mode MODE_iP.

In example embodiments, the specific signal including one or more bits that control whether to use internal processing mode or not, also described as a mode indicator, includes a separate control signal or special command, a combination of commands, a mode register set (MRS), a particular bit of an address, a signal received by a dedicated pin of the semiconductor memory device 100, a combination of addresses, or the like. After the semiconductor memory device 100 enters the internal processing mode MODE_iP, the processing information PI may be written into the first area by the host 11. In example embodiments, when the processing information PI is previously written or uploaded into the first area 111, a write operation for the processing information PI may be omitted.

Subsequently, the processing information PI written into the first area 111 may be accessed (i.e., read) by the host 11. In this case, the internal processor 120 may perform an internal processing operation based on the read processing information PI. In example embodiments, a write operation or a read operation on the processing information PI may be performed by normal write and read commands.

In example embodiments, in the normal mode, the semiconductor memory device 100 may write data DATA (user data) into the first area 111 under the control of the host 11. For example, in the internal processing mode MODE_iP, the first area 111 may be used as an area to write the processing information PI. And in the normal mode, the first area 111 may be used as an area to store the user data, in a manner similar to the second area 112.

As described above, the semiconductor memory device 100 includes the internal processor 120 that performs an internal processing operation. When the semiconductor memory device 100 enters the internal processing mode MODE_ip, the internal processor 120 may perform the internal processing operation based on the processing information PI stored in the first area 111 under the control of the host 11.

Figure 2:
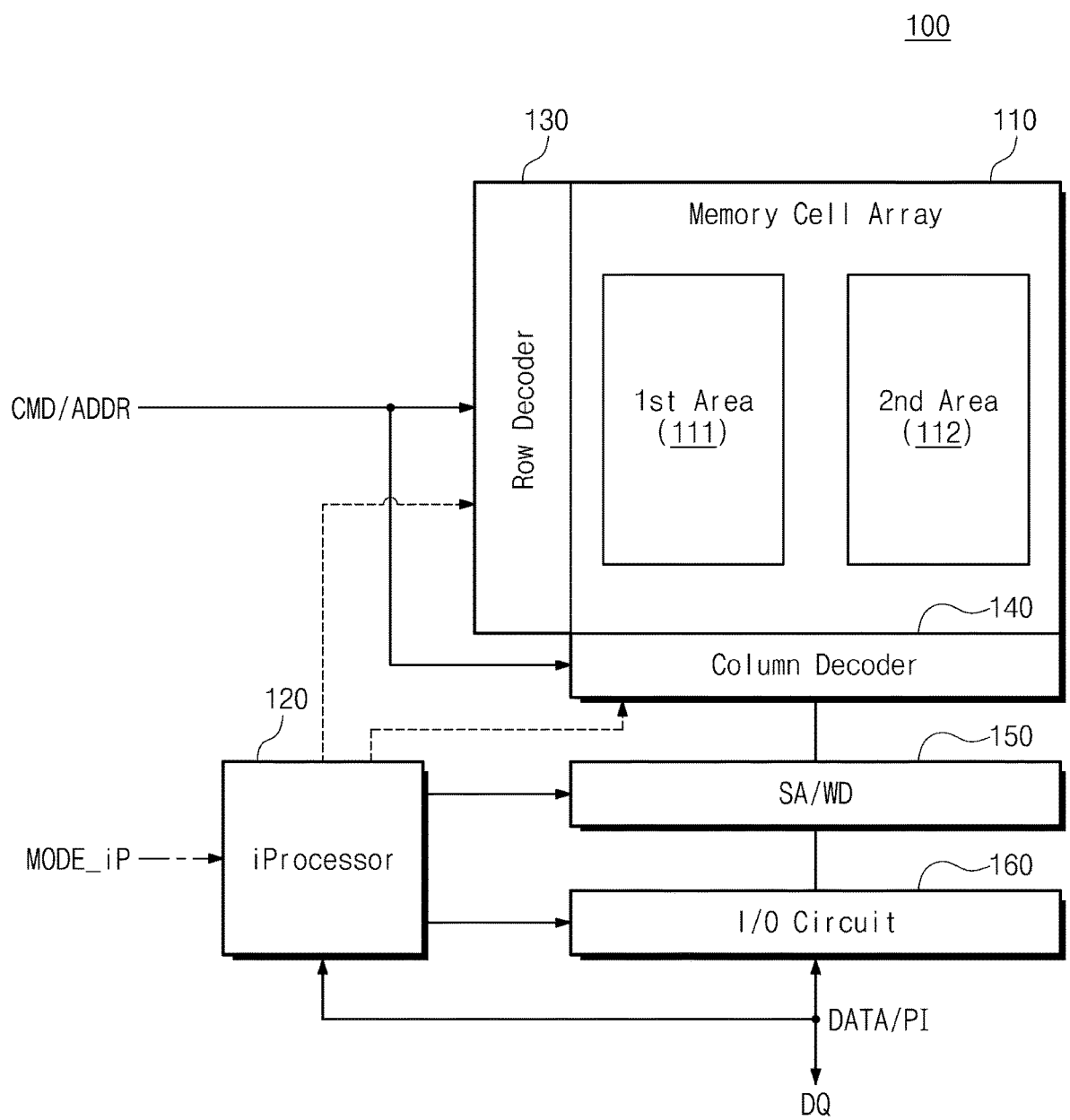
FIG. 2 is a block diagram of a semiconductor memory device in FIG. 1, according to example embodiments.

FIG. 2 is a block diagram of the semiconductor memory device 100 in FIG. 1. For brevity of description, it will be assumed that the semiconductor memory device 100 is a DRAM, but example embodiments of inventive concepts are not limited thereto. Referring to FIGS. 1 and 2, the semiconductor memory device 100 may include a memory cell array 110, an internal processor 120, a row decoder 130, a column decoder 140, a sense amplifier/write driver 150, and an input/output (I/O) device 160.

The memory cell array 110 may include a plurality of memory cells. The plurality of memory cells may be connected to a plurality of wordlines (not shown) and a plurality of bitlines (not shown), respectively. The memory cell array 110 may be divided into a first area 111 and a second area 112. The first area 111 may store processing information PI or data DATA (i.e., user data), and the second area 112 may store data DATA. For example, in a normal mode, the first area 111 may be configured to store the data DATA (i.e., user data). In an internal processing mode MODE_iP, the first area 111 may be configured to store the processing information PI. As described above, the first area 111 may be a logically or physically predetermined area or an arbitrarily set area.

The row decoder 130 may be configured to be connected to the memory cell array 110 through a plurality of wordlines (not shown). The row decoder 130 may activate a wordline (or row) corresponding to an address ADDR in response to a command CMD and the address ADDR (in particular, row address) from the host 11.

The column decoder 140 may be configured to be connected to the memory cell array 110 through a plurality of bitlines (not shown). The column decoder 140 may select a bitline corresponding to an address ADDR in response to the command CMD and the address ADDR (in particular, column address) from the host 11.

The sense amplifier/write driver 150 may sense or control a voltage of bitlines selected by the column decoder 140. The I/O device 160 may receive the data DATA from the host 11 through a data line DQ and may provide the received data DATA to the sense amplifier/write driver 150. The I/O device 160 may receive the data DATA from the sense amplifier/write driver 150 and may provide the received data DATA to the host 11 through a data line DQ.

As described above, when the semiconductor memory device 100 enters the internal processing mode MODE_iP, the internal processor 120 may perform an internal processing operation. At this point, the internal processor 120 may transmit and receive the processing information PI or the data DATA to and from the host 11. Alternatively, the internal processor 120 may exchange the processing information PI or the data DATA with the sense amplifier/write driver 150 or the I/O device 160.

For example, when the semiconductor memory device 100 enters the internal processing mode MODE_iP, the host 11 may provide a command CMD and an address ADDR to the semiconductor memory device 100 such that the processing information PI is written into the first area 111. At this point, the processing information PI may be written into the first area 111 through the data line DQ. The semiconductor memory device 100 may access (i.e., read) the processing information PI written into the first area 111 under the control of the host 11. The read processing information PI may be provided to the internal processor 120 from the sense amplifier/write driver 150 or the I/O device 160. Alternatively, when the semiconductor memory device 100 enters the internal processing mode MODE_iP, the processing information PI may be directly transmitted to the internal processor 120 through the data line DQ.

The internal processor 120 may perform an internal processing operation based on the processing information PI. In example embodiments, the internal processor 120 may control the row decoder 130, the column decoder 140, the sense amplifier/write driver 150, and the I/O device 160 to perform the internal processing operation. For example, the internal processor 120 may control a sense amplifier/write driver 150 and I/O device 160 to read the processing information PI, and that information can then be input into the internal processor 120 for controlling processing.

Figure 3:
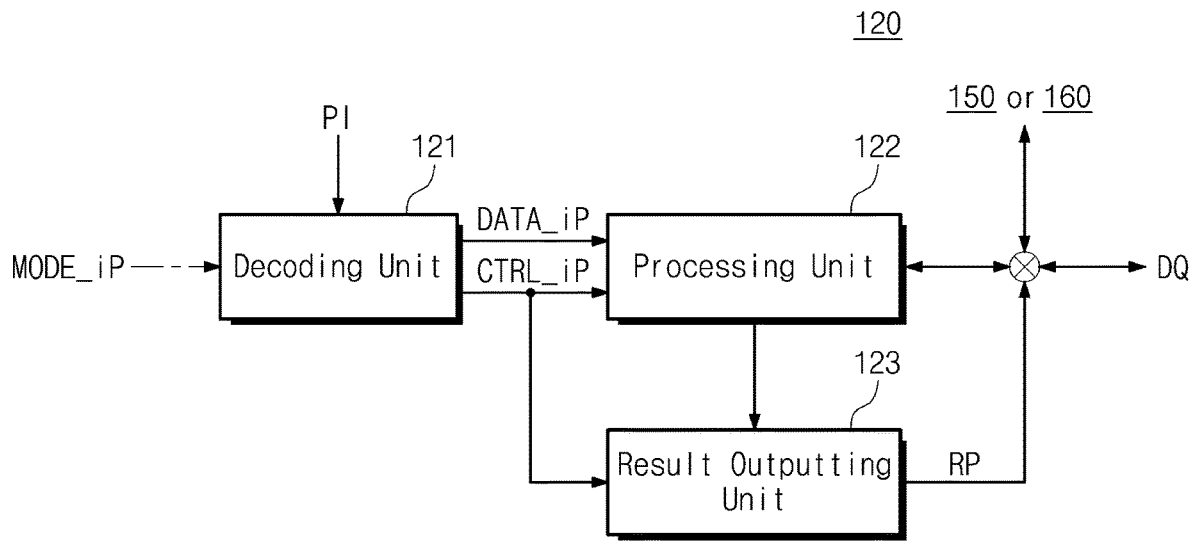
FIG. 3 is a block diagram of an internal processor in FIGS. 1 and 2, according to example embodiments.

FIG. 3 is a block diagram of the internal processor 120 in FIGS. 1 and 2. For brevity of description, only some components of the internal processor 120 are shown in FIG. 3, but components of the internal processor 120 are not limited thereto.

Referring to FIGS. 1 and 3, the internal processor 120 may include a decoding unit 121, a processing unit 122, and a result outputting unit 123.

The decoding unit 121 may include a circuit configured to decode the processing information PI from the first area 111 and to output internal processing data DATA_iP and an internal processing control signal CTRL_iP based on a decoding result in response to the internal processing mode MODE_iP. For example, the processing information PI may include information such as internal processing data and command information for the internal processing operation performed by the internal processor 120. In example embodiments, the command information may be a command indicating type of an internal processing operation (e.g., data search, data add, data move, data compare, data swap, and data process). The internal processing data may indicate reference data or target data used in the internal processing operation.

The processing unit 122 may include a circuit configured to perform an internal processing operation based on the internal processing control signal CTRL_iP and the internal processing data DATA_iP. According to type of the internal processing operation, the internal processing unit 122 may read data from the memory cell array 111 or write data into the memory cell array 111 through the sense amplifier/write driver 150 or the I/O device 160. The internal processing unit 122 may provide a result of process RP of the internal processing operation. In example embodiments, the result of process RP may include information such as information on whether the internal processing data DATA_iP is hit or miss, a data move result, and address information.

The result outputting unit 123 may output the result of process RP through the data line DQ or write the result of process RP through the sense amplifier/write driver 150 or the I/O device 160 in response to the internal processing control signal CTRL_iP.

Figure 4:
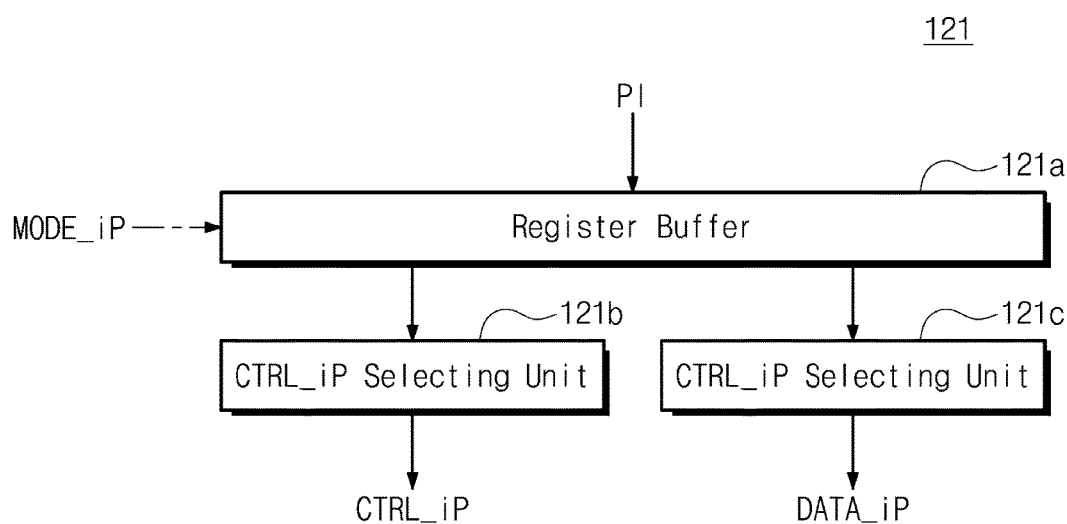
FIG. 4 is a block diagram of a decoding unit in FIG. 3, according to example embodiments.

FIG. 4 is a block diagram of the decoding unit 121 in FIG. 3, according to one example embodiment. Referring to FIGS. 2 and 4, the decoding unit 121 may include a circuit that includes a register buffer 121a, an internal processing control selecting unit 121b, and an internal processing data selecting unit 121c.

The processing information PI from the first area 111 may be temporarily stored in the register buffer 121a. As described above, the processing information PI may include information such as internal processing data and command information for an internal processing operation. For example, the processing information PI may include a plurality of bits. Some of the bits may be the command information for an internal processing operation, and the other bits may be the internal processing data. For example, at least part of the processing information PI may be information about processing (e.g., instructions or an address). Some of the processing information PI may be information to be processed (e.g., data to be stored or used by the instructions).

The internal processing control signal selection unit 121b may output an internal processing control signal CTRL_iP based on data bits indicating the command information for an internal processing operation among the processing information PI stored in the register buffer 121a. The internal processing data selecting unit 121c may select data bits indicating the internal processing data among the processing information PI stored in the register buffer 121a and may output the selected data bits as the internal processing data DATA_iP.

In example embodiments, the internal processing data DATA_iP may be reference data or target data of an internal processing operation and may be variably selected according to type of the internal processing operation.

Figure 5:
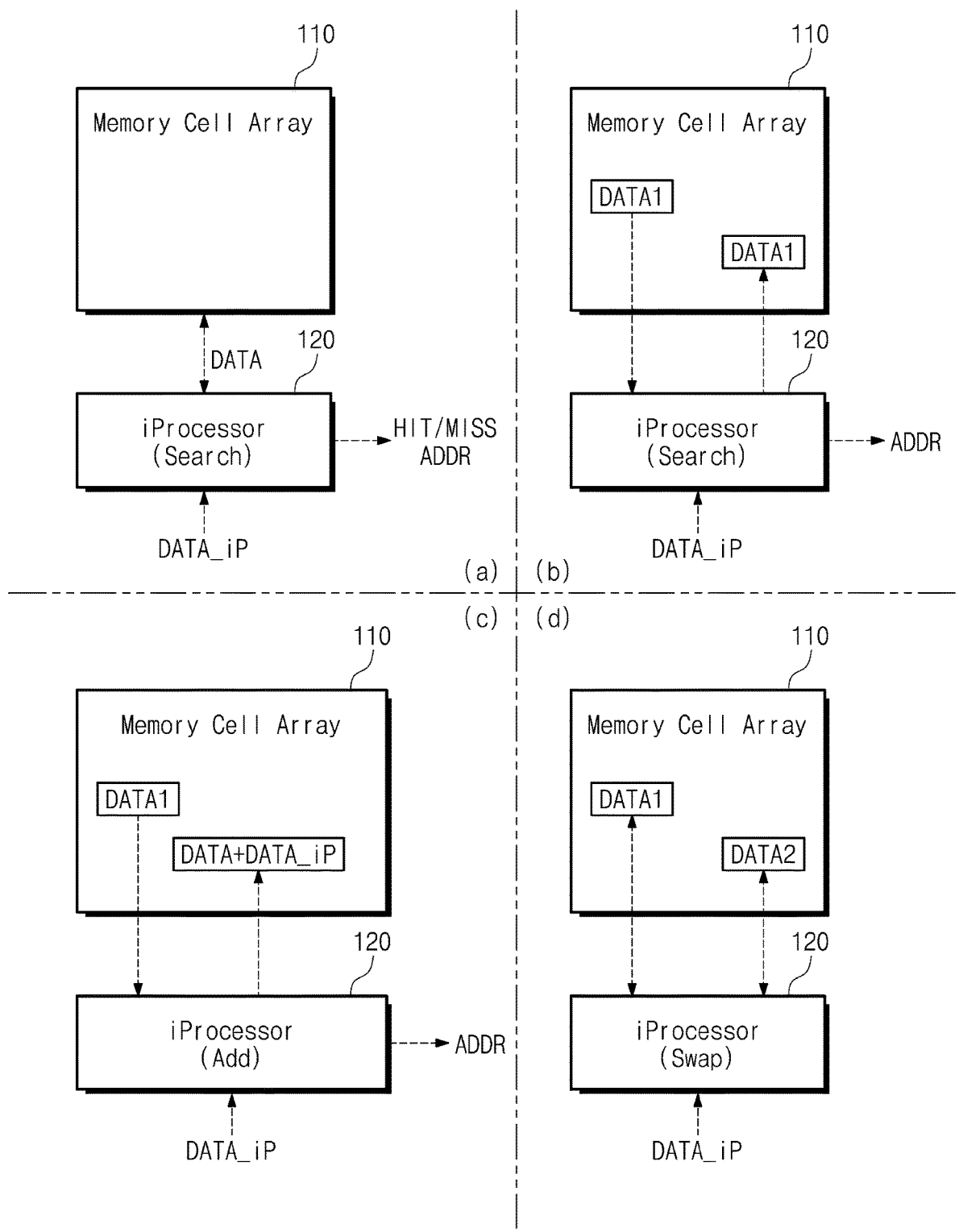
FIG. 5 illustrates an internal processing operation of the internal processor in FIG. 3, according to example embodiments.

FIG. 5 illustrates an internal processing operation of the internal processor 120 in FIG. 3. Although an internal processing operation such as data search, data move, data add, and data swap will now be described with reference to FIG. 5, example embodiments of inventive concepts are not limited thereto.

For brevity of the drawing and description, components unnecessary to describe the internal processing operation will be omitted. Referring to FIG. 3 and (a) in FIG. 5, the processing information PI may include command information for data search. The internal processor 120 may search whether the internal processing data DATA_iP is stored in the memory cell array 110. For example, based on the processing information PI, the internal processor 120 may search whether the internal processing data DATA_iP included in the processing information PI is stored in the memory cell array 110. In example embodiments, the internal processor 120 may selectively output HIT/MISS or address ADDR as a result of process RP.

Referring to FIG. 3 and (b) in FIG. 5, the processing information PI may include command information for data move. In this case, the internal processing data DATA_iP may include specific address information and the internal processor 120 may move first data DATA1 corresponding to the internal processing data DATA_iP (i.e., the specific address information) to a target area. In example embodiments, the internal processor 120 may selectively output address (ADDR) information of the moved area as a result of process RP.

Referring to FIG. 3 and (c), the processing information PI may include command information for data add. In this case, the internal processor 120 may add the internal processing data DATA_iP to the first data DATA1 and may store the added data DATA1+DATA_iP in the memory cell array 110. In example embodiments, the internal processor 120 may selectively output address (ADDR) information of an area in which the added data DATA1+DATA_iP is stored, as a result of process RP.

Referring to FIG. 3 and (d) in FIG. 5, the processing information PI may include command information for data swap. In this case, the internal processing data DATA_iP may include specific address information and the internal processor 120 may swap first and second data DATA1 and DATA2 corresponding to the internal processing data DATA_iP (i.e., the specific address information) with each other.

In the example embodiments of FIGS. 3 and 4, it has been described that the internal processing data DATA_iP is included in the processing information PI. However, example embodiments of inventive concepts are not limited to the description. For example, in (a) to (d) in FIG. 5, the internal processing data DATA_iP may be provided from the host 11, another external device or the memory cell array 110 in an internal processing mode MODE_iP.

In example embodiments, the above-described data exchange between the memory cell array 110 and the internal processor 120 may be performed without separate control from the host 11 during an internal processing operation. For example, even if a host initially sends a command that instructs performance of internal processing operations, the internal processing operations are nonetheless carried out by an internal processor 120 of the semiconductor memory device 100. Although some examples of the internal processing operation have been described with reference to FIG. 5, example embodiments of inventive concepts are not limited thereto. It is to be understood that the internal processing operation can be variously modified or added to without departing from the spirit and scope of the present disclosure.

Figure 6:
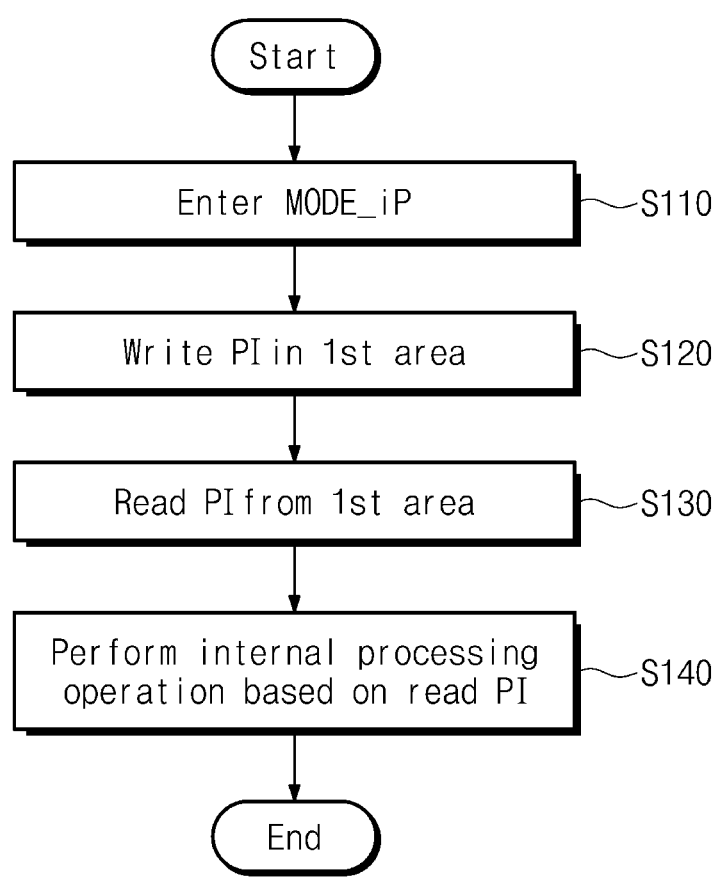
FIG. 6 is a flowchart summarizing operation of the semiconductor memory device in FIG. 2, according to example embodiments.

FIG. 6 is a flowchart summarizing an operation of the semiconductor memory device 100 in FIG. 2. Referring to FIGS. 2 and 6, in a step S110, the semiconductor memory device 100 may enter the internal processing mode MODE_iP. For example, the semiconductor memory device 100 may enter the internal processing mode MODE_iP under the control of the host 11. In example embodiments, the semiconductor memory device 100 may enter the internal processing mode MODE_iP or the internal processing mode MODE_iP may be activated by a response to a dedicated signal (or mode signal) from the host 11, a response to an address of a specific area, a response to a mode register set (MRS), a specific command or a vendor command combination.

In a step S120, the semiconductor memory device 100 may write the processing information PI into the first area 111. For example, the semiconductor memory device 100 may write the processing information PI into the first area 111 in response to a write command from the host 11. The first area 111 may be a predetermined area, an area set by the host 11 or an arbitrary area. In some embodiments, the first area 111 may be a spare area or a redundant area. The spare area or the redundant area may be an area including redundant cells for replacing failed cells in the semiconductor memory device 100.

In a step S130, the semiconductor memory device 100 may read the processing information PI from the first area 111. For example, the semiconductor memory device 100 may read the processing information PI written into the first area 111 in response to a read command from the host 11. In example embodiments, the write command the read command in the steps S120 and S130 may be identical to or similar to those used in the normal mode, respectively.

In a step S140, the semiconductor memory device 100 may perform an internal processing operation based on the read processing information PI. For example, the internal processor 120 of the semiconductor memory device 100 may perform the above-described internal processing operation based on the read processing information PI. Though not shown in FIG. 6, in one embodiment, a result of the internal processing operation is stored in the memory cell array 110 (e.g., either in first Area 111 or in second Area 112). In addition, later, an external device can access the results information, for example, buy reading the results from the memory cell array 110. For example, the results of an internal processing operation can be stored in a predetermined area of the memory cell array 110, and a host can be informed of that area. Later, the host can access the predetermined area to read the results.

Figure 7:
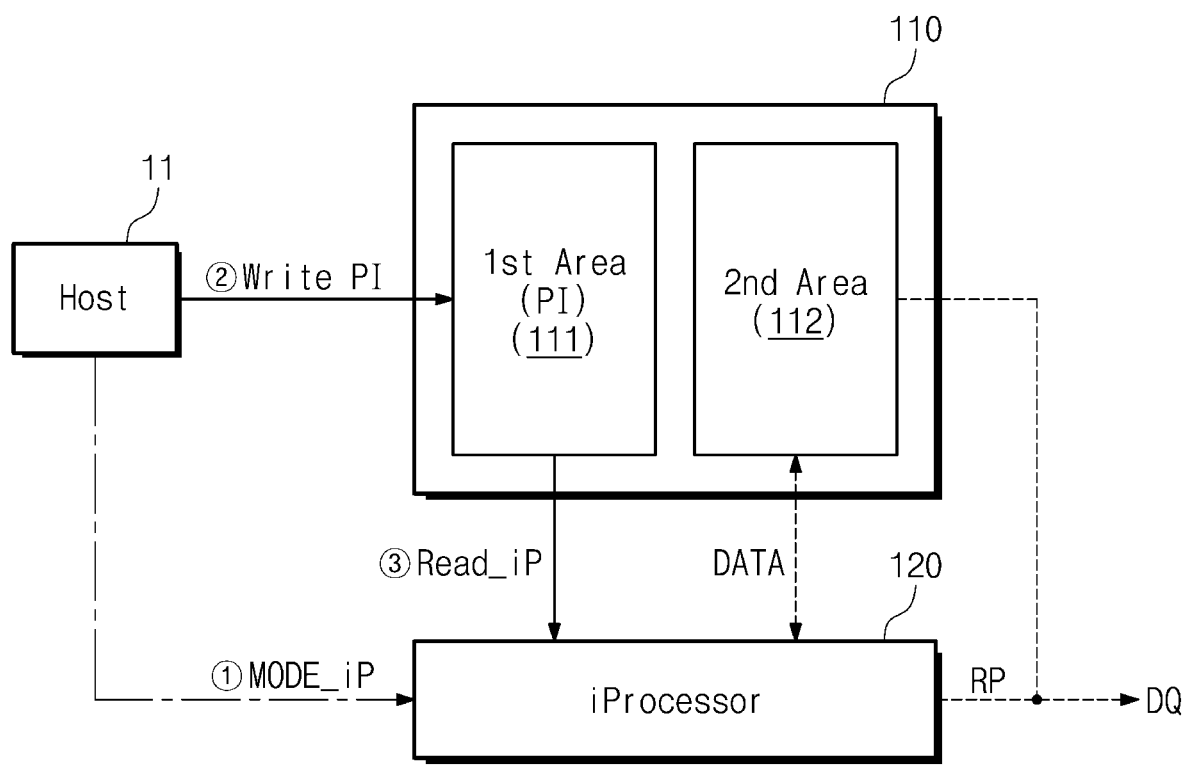
FIG. 7 is a block diagram to describe the operation in FIG. 6, according to example embodiments.

FIG. 7 is a block diagram to describe the operation in FIG. 6, according to some embodiments. For brevity of the drawing, components unnecessary to describe the internal processing operation will be omitted. Referring to FIGS. 6 and 7, the host 11 may activate the internal processing mode MODE_iP or the semiconductor memory device 100 may enter the internal processing mode MODE_iP under the control of the host 11 (①). For example, as described with reference to FIG. 1, the semiconductor memory device 100 may enter the internal processing mode MODE_iP under the control of the host 11.

As described above, in FIG. 7, a configuration of entering the internal processing mode MODE_iP will be shown by a broken line. This configuration is not limited to a configuration of providing a specific signal from the host 11 to the semiconductor memory device 100. It is to be understood that this configuration may simply indicate entry into the internal processing mode MODE_iP of the semiconductor memory device 100. In addition, the semiconductor memory device 100 may enter the internal processing mode MODE_iP under the control of the host 11, which will be understood to include activation of the internal processing mode MODE_iP.

Then the host 11 may write the processing information PI into the first area 111. For example, the host 11 may write the processing information PI into the first area 111 using a write command (②). As described above, the write command may be, for example, a write command used in a normal mode and may be written into the memory cell array 110 through a data line DQ. As described above, the first area 111 may be, for example, a predetermined area, an arbitrary area, an area defined by the host 11, and/or may be a spare/redundant area.

Then the host 11 may access (i.e., send a read command to) the first area 111 into which the processing information PI is written (③). At this point, since the semiconductor memory device 100 is in the internal processing mode MODE_iP, the read processing information PI will be provided not to the host 11 but to the internal processor 120. As described above, the internal processor 120 may perform the internal processing operation based on the read processing information PI. In example embodiments, the internal processor 120 may access the second area 112 in which data DATA (i.e., user data) is stored, according to type of the internal processing operation. The internal processor 120 may provide a result of process RP to the host 11 through the data line DQ and/or may write the result of process RP into the memory cell array 110 (e.g., to second area 112, or to first' area 111) through the data line DQ.

As described above, the semiconductor memory device 100 may store processing information PI for the internal processing operation in a specific area (e.g., the first area 111) of the memory cell array 110. Thus, since variation of a conventional interface may be reduced and an internal processing operation may be performed, a semiconductor memory device with improved performance and reduced cost is provided.

Figure 8:
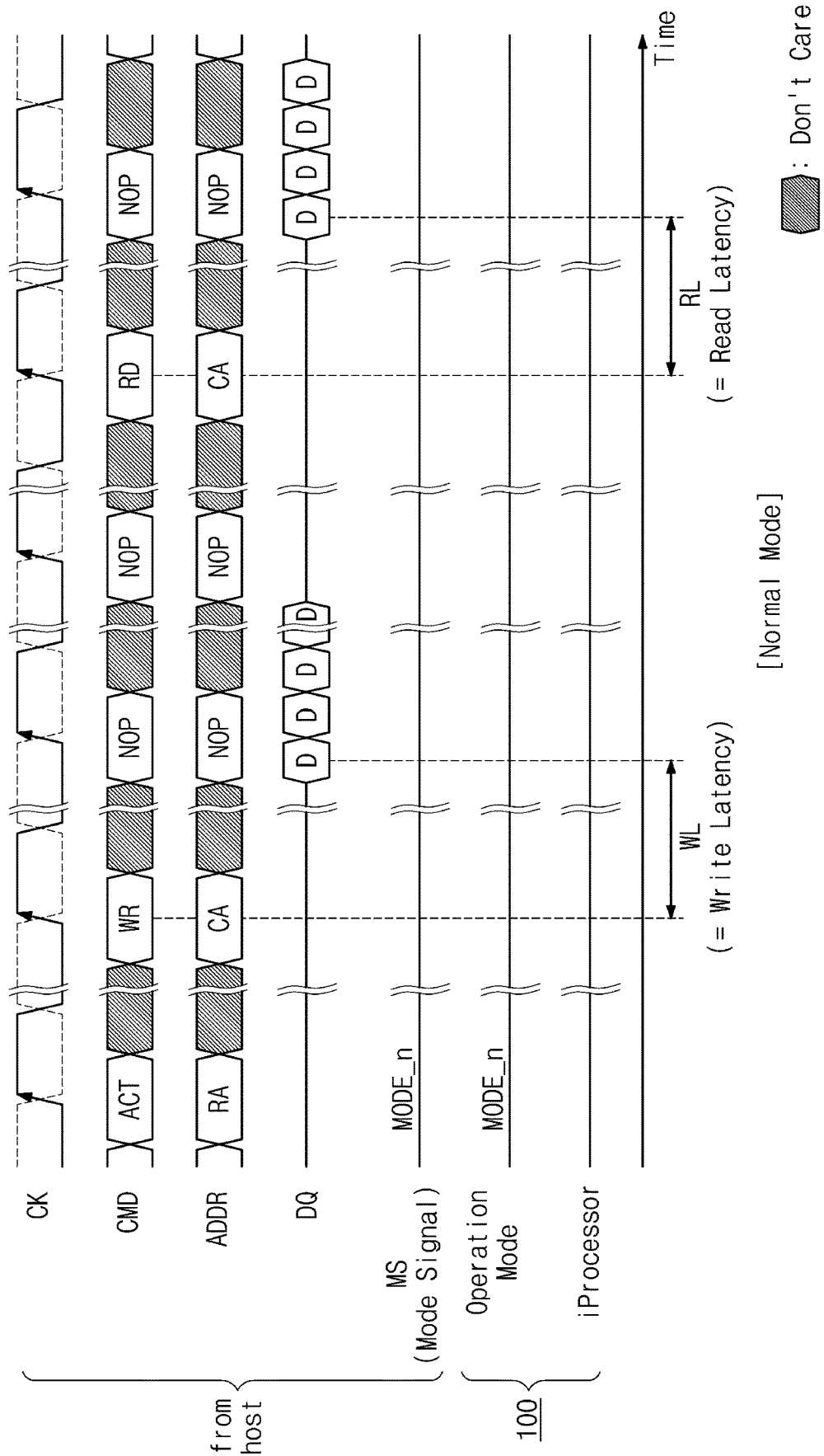
FIGS. 8 and 9 are timing diagrams to describe operation of the semiconductor memory device in FIG. 2, according to example embodiments.
Figure 9:
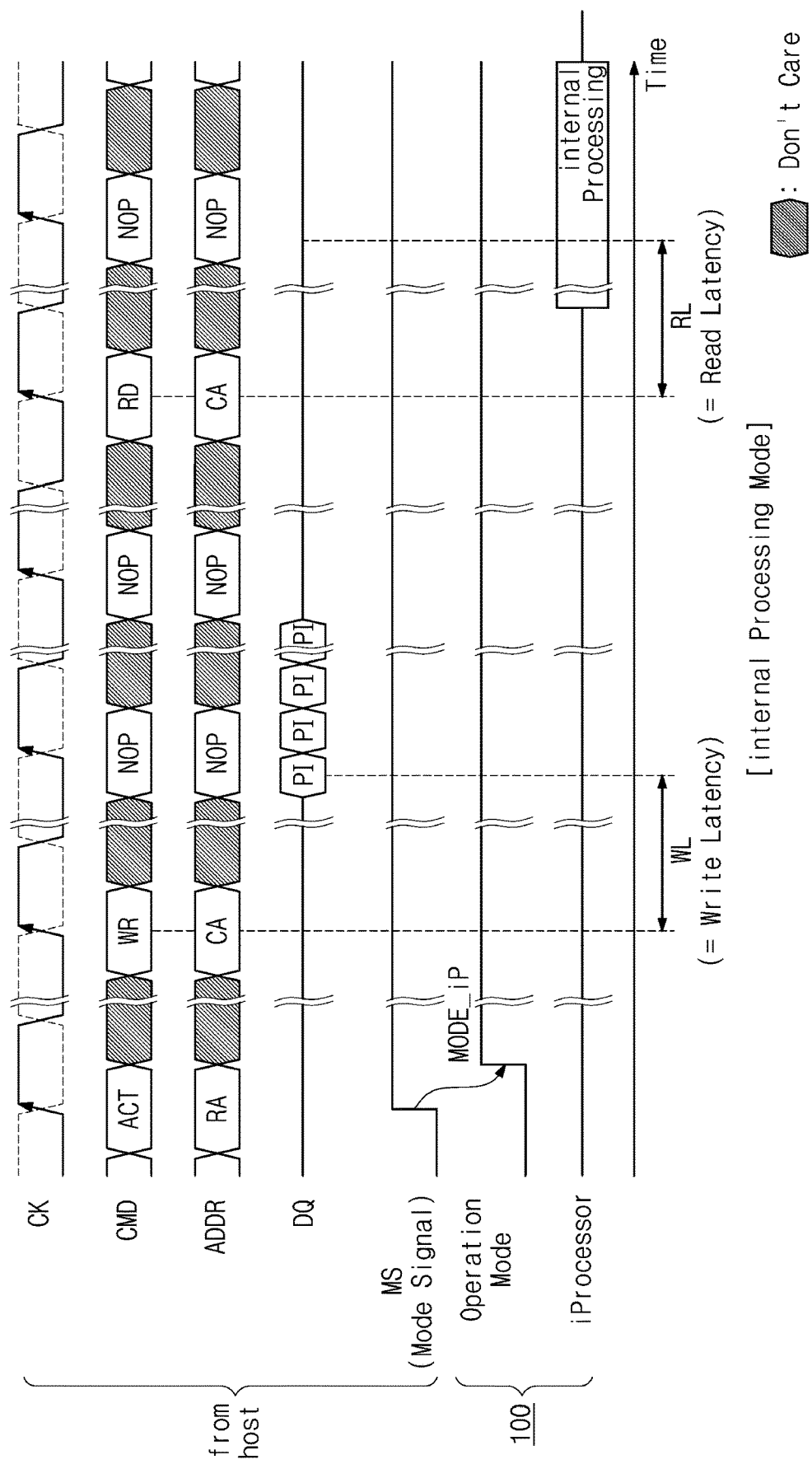

FIGS. 8 and 9 are timing diagrams to describe operation of the semiconductor memory device 100 in FIG. 2. In FIGS. 8 and 9, x-axes represent times, respectively. A normal mode operation of the semiconductor memory device 100 will be described with reference to FIG. 8. An internal processing mode operation of the semiconductor memory device 1000 will be described with reference to FIG. 9.

For ease of description, it will be assumed that the semiconductor memory device 100 enters an internal processing mode MODE_iP in response to a mode indicator. The mode indicator may be, for example, a mode signal MS from the host 11. In one embodiment, the mode signal MS may indicate a control signal provided from the host 11 to the semiconductor memory device 100 through a separate signal line. In one embodiment, a mode signal MS may be a bit that can be either a logic-high or a logic-low, and it will be assumed that the mode signal MS indicates a normal mode MODE_n when the mode signal MS is a logic-low level and indicates an internal processing mode MODE_iP when the mode signal MS is a logic-high level. However, example embodiments are not limited to this assumption.

Referring to FIGS. 2 and 8, a write-to-read operation in the normal mode will now be described. The semiconductor memory device 100 may receive a clock CK, a command CMD, an address ADDR, and a mode signal MS from the host 11 and may exchange data D with the host 11 through the data line DQ in response to the received signals.

In example embodiments, the mode signal MS may be provided as a logic-low level such that the semiconductor memory device 100 operates in the normal mode MODE_n.

For example, the semiconductor memory device 100 may receive an active command ACT and a row address RA from the host 11 and may activate a row corresponding to the row address RA in response to the received signals. Then the semiconductor memory device 100 may receive a write command WR and a column address CA from the host 110. After a predetermined time (e.g., write latency WL) has elapsed from a time point at which the write command WR was received, the semiconductor memory device 100 may receive data D and may write the received data D into memory cells corresponding to a column address CA among memory cells of the activated row.

Then the semiconductor memory device 100 may receive a read command RD and a column address CA from the host 11. After a predetermined time (e.g., read latency RL) has elapsed from a time point at which the read command RD was received, the semiconductor memory device 100 may output the data D written into memory cells corresponding to the column address CA through the data line DQ.

As described above, in the normal mode MODE_n (i.e., when the internal processing mode MODE_iP is deactivated), the semiconductor memory device 100 may perform write and read operations according to a predetermined latency (i.e., WL and RL).

Referring to FIGS. 2 and 9, the semiconductor memory device 100 may enter the internal processing mode MODE_iP in response to the mode signal MS from the host 11. When the semiconductor memory device 100 is in the internal processing mode MODE_iP, the semiconductor memory device 100 may receive an active command ACT and a row address RA from the host 11 and may active the row address RA in response to the received active command ACT. The row address RA may be an address corresponding to a row included in the first area 111.

Then the semiconductor memory device 100 may receive a write command WR and a column address CA from the host 11. After a predetermined time (e.g., write latency WL) has elapsed from a time point at which the write command WR was received, the semiconductor memory device 100 may receive the processing information PI from the host 11 and may write the received processing information PI into memory cells corresponding to the column address CA among memory cells of the active row. In this manner, the semiconductor memory device 100 may write the received processing information PI into the first area 111 in response to the write command WR.

Then the semiconductor memory device 100 may receive a read command RD and a column address CA from the host 11. The semiconductor memory device 100 may read the processing information PI from memory cells corresponding to the column address CA (i.e., the first area 111) and may perform an internal processing operation (i-Processing) based on the read processing information PI. For example, as described above, the internal processing mode MODE_iP may be activated by the mode signal MS from the host 11. When the processing information PI stored in the first area 111 is read while the internal processing mode MODE_iP is activated, the internal processor 120 may perform the internal processing operation.

In example embodiments, the write command WR and the read command RD in FIG. 9 may be identical to or similar to those in FIG. 8. For example, the internal processing operation of the semiconductor memory device 100 may be supported or implemented using a normal write or read command.

In example embodiments, when the internal processing operation is performed, data transaction with the host 11 according to the read command RD may not be performed. For example, in a normal mode, read data may be output through the data line DQ after a data latency has elapsed from a time point at which the read command RD was received, as described with reference to FIG. 8. As described in FIG. 9, when the internal processing operation is performed (i.e., when the semiconductor memory device 100 enters the internal processing mode), a data transaction with the host 11 may not be performed immediately after the read latency RL has elapsed from a time point at which the read command RD is received.

In example embodiments, although not shown in the drawing, read data (i.e., read processing information PI) may be output through the data line DQ and the internal processor 120 may perform an internal processing operation after a predetermined time (i.e., the read latency RL) has elapsed from a time point at which the read command RD is received. In this case, a result of process may be provided to the host 11 through the data line DQ after the internal processing operation is completed. Alternatively, or additionally, a result of the process may be provided and stored within the semiconductor memory device 100, such as in one of the first Area 111 or second Area 112.

The operation of the semiconductor memory device 100 described with reference to FIGS. 8 and 9 is merely exemplary and is not intended to limit the scope of the present disclosure. For example, in the internal processing mode MODE_iP, a write operation or a read operation for performing the internal processing operation may be omitted according to a manner of implementing certain example embodiments. For example, when the processing information PI is stored in the first area 111 in advance, a write command (or write operation) on the processing information PI shown in FIG. 9 may be omitted. Alternatively, if the processing information PI is provided to the internal processor 120 while the processing information PI is written into the first area 111, a read command (or read operation) on the processing information PI of the first area 111 may be omitted.

In addition, the mode signal MS may be omitted according to a manner of implementing example embodiments of inventive concepts. The host 11 may allow the semiconductor memory device 100 to enter the internal processing mode MODE_iP through various manners described below.

Figure 10:
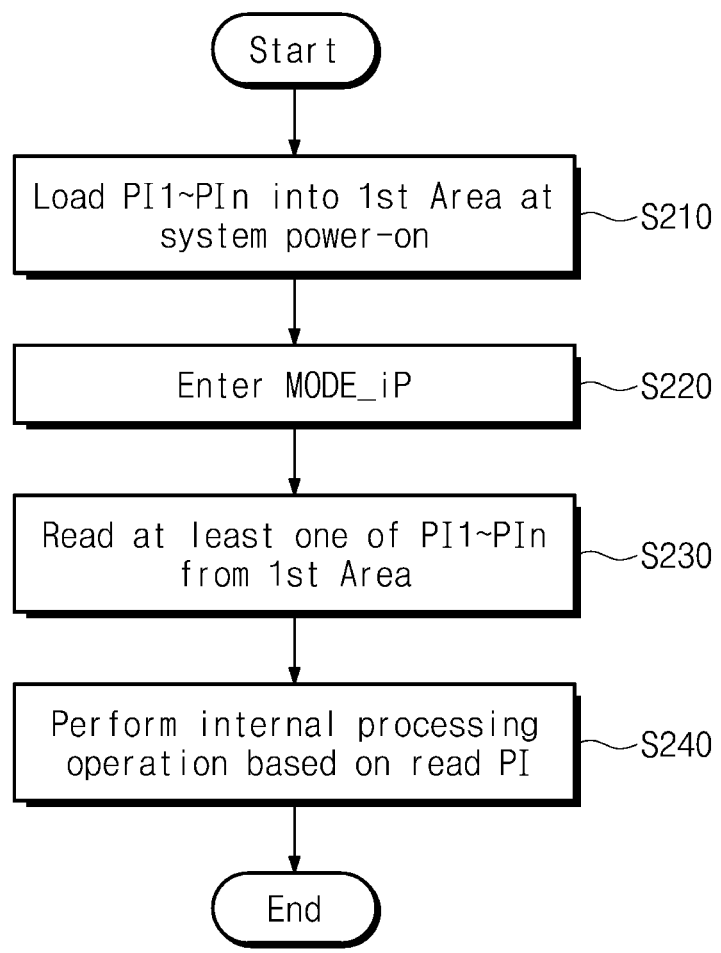
FIG. 10 is a flowchart summarizing operation of the semiconductor memory device in FIG. 2 according to example embodiments.

FIG. 10 is a flowchart summarizing operation of the semiconductor memory device 100 in FIG. 2 according to example embodiments. Referring to FIGS. 1, 2, and 10, in a step S210, the semiconductor memory device 100 may upload first to $n^{th}$ processing information PI1 to PIn at system power-on. For example, when the user system 10 including the semiconductor memory device 100 is powered on, the host 11 may store the first to $n^{th}$ processing information PI1 to PIn in the first area 111.

Each of the first to $n^{th}$ processing information PI1 to PIn may include command information for an internal processing operation or information on internal processing data. For example, the first processing information PI1 may include information on data search and the second processing information PI2 may include information on data add. However, example embodiments of inventive concepts are not limited thereto.

In a step S220, the semiconductor memory device 100 may enter the internal processing mode MODE_iP. For example, the semiconductor memory device 100 may enter the internal processing mode MODE_iP or the internal processing mode MODE_iP may be activated in response to a dedicated signal (or mode signal) from the host 11 described with reference to FIG. 9 or in response to an address for a specific area, a mode register set (MRS), a specific command or a vendor command combination.

In a step S230, the semiconductor memory device 100 may read at least one of the first to $n^{th}$ processing information of the first area 111. For example, the semiconductor memory device 100 may read at least one of the first to $n^{th}$ processing information of the first area 111 under the control of the host 11 (i.e., read command).

Then the semiconductor memory device 100 may perform an operation of the step S240. The operation of the step S240 is similar to that of the step S140 in FIG. 6 and will not be described in detail. As described above, when the processing information PI is stored in the first area 111 in advance, a write operation for writing the processing information PI may be omitted.

Figure 11:
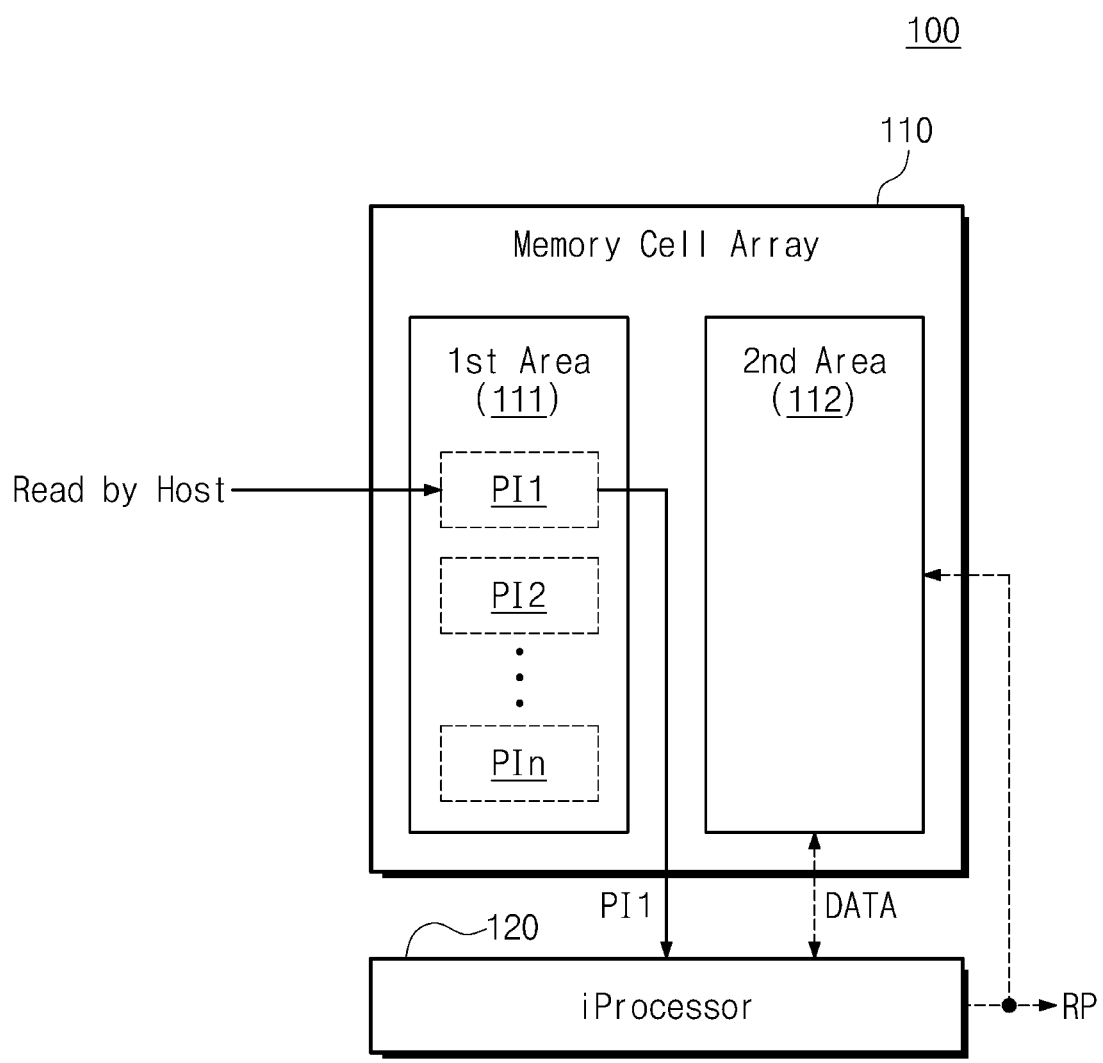
FIG. 11 is a block diagram to describe the operation in FIG. 10, according to example embodiments.

FIG. 11 is a block diagram to describe the operation in FIG. 10. For brevity of the drawing, detailed description of components unnecessary to describe the operation in FIG. 10 will be omitted.

Referring to FIGS. 10 and 11, the semiconductor memory device 100 may include a memory cell array 110 and an internal processor 120. Unlike the description in FIG. 7, in FIG. 11, a plurality of processing information PI1 to PIn may be preloaded into the first area 111. For example, when the user system 10 (see FIG. 1) including the semiconductor memory device 100 is powered on (e.g., at start-up), the plurality of processing information PI1 to PIn may be written into the first area 111 by the host 11. In example embodiments, the plurality of processing information PI1 to PIn may be information stored in a separate storage medium (e.g., a nonvolatile memory device or system) included in the user system 10. For example, the plurality of processing information PI1 to PIn, prior to being written to first area 111 may be stored in a separate, second region of the memory device 100, such as a storage circuit, a register, or a fuse circuit, or even the second area 112.

To perform an internal processing operation, the host 11 may activate the internal processing mode MODE_iP (i.e., may allow the semiconductor memory device 100 to operate in the internal processing mode MODE_iP) and may access (i.e., read) processing information corresponding to an internal processing operation desired to be performed. For example, the first processing information PI1 may be processing information indicating data search. The host 11 may access (i.e., read) the first processing information PI1 such that the semiconductor memory device 100 performs data search. The semiconductor memory device 100 may perform an internal processing operation (e.g., data search) corresponding to the read first processing information PI1.

As described with reference to FIG. 11, the semiconductor memory device 100 may store the plurality of processing information PI1 to PIn for the internal processing operation in the first area 111 in advance. Thus, the host 11 may omit a write operation of the processing information PI. In example embodiments, the host 11 may modify the plurality of processing information PI1 to PIn stored in the first area 111. For example, the host 11 may modify each of the plurality of processing information PI1 to PIn to change target data of each of the plurality of processing information PI1 to PIn.

Figure 12:
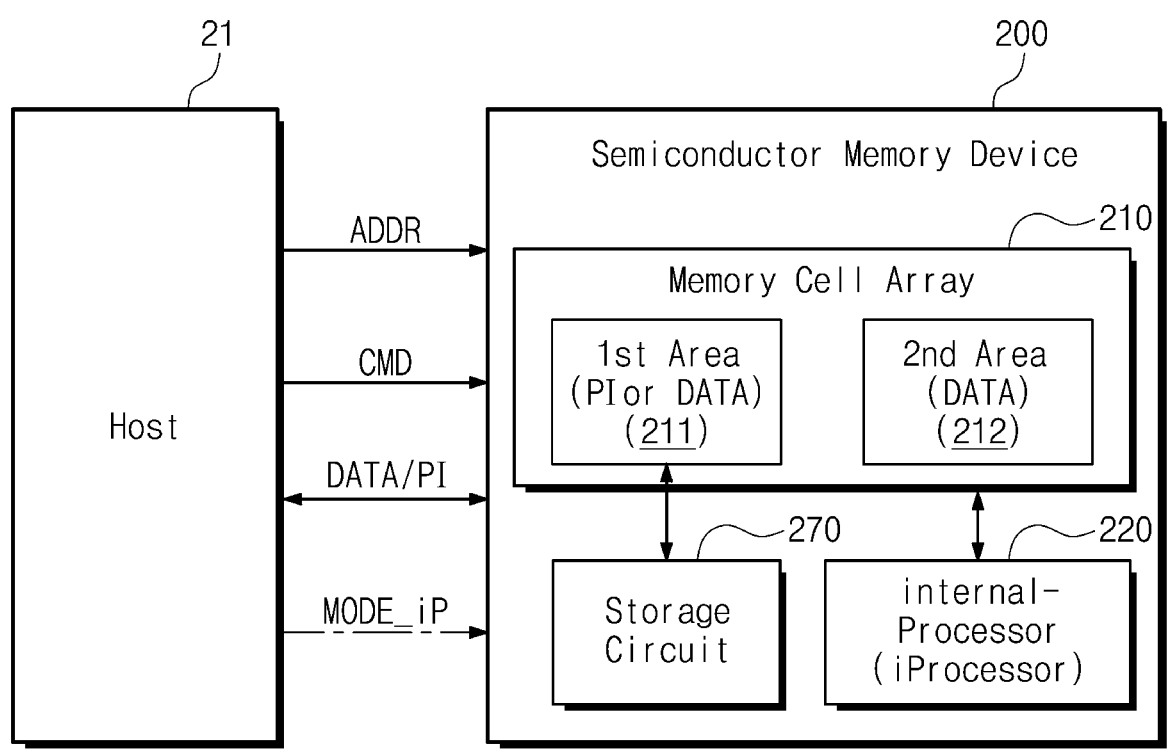
FIG. 12 is a block diagram of a user system according to example embodiments of inventive concepts.
Figure 13:
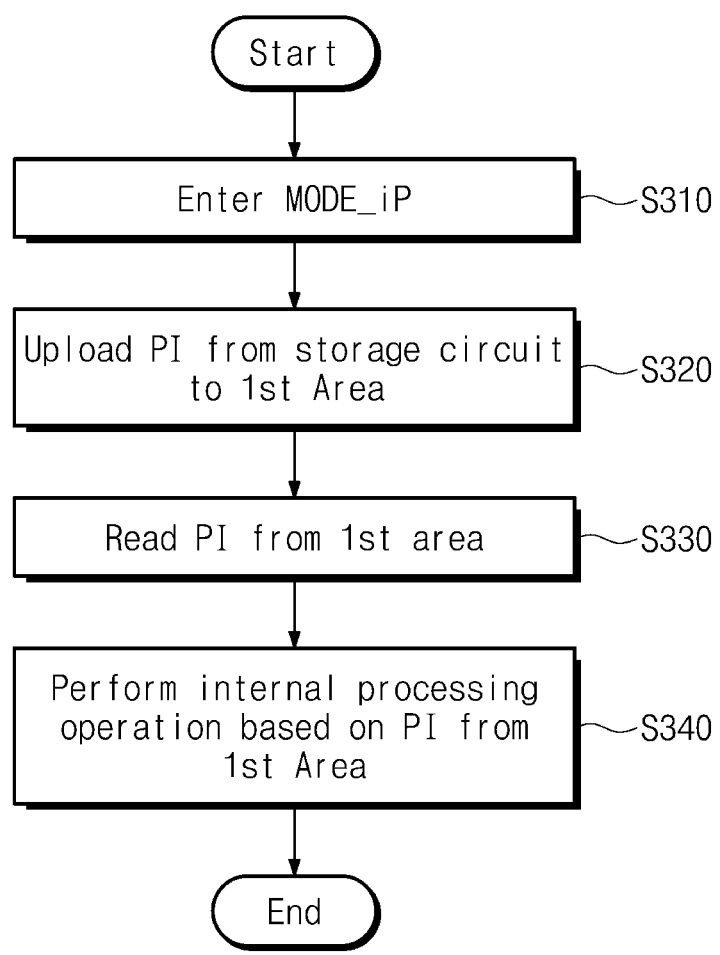
FIG. 13 is a flowchart summarizing operation of a semiconductor memory device in FIG. 12, according to example embodiments.

FIG. 12 is a block diagram of a user system 20 according to example embodiments of inventive concepts, and FIG. 13 is a flowchart summarizing operation of a semiconductor memory device 200 in FIG. 12. For brevity of description, detailed description of the above-described components will be omitted.

Referring to FIG. 12, the user system 20 includes a host 21 and a semiconductor memory device 200. The semiconductor memory device 200 includes a memory cell array 210, an internal processor 220, and a storage circuit 270. The memory cell array 210 includes a first area 211 and a second area 212. The host 21, the semiconductor memory device 200, the memory cell array 210, the internal processor 220, the first area 211, and the second area 212 have already been described with reference to FIG. 1 and will not be described in detail.

A storage circuit 270 may be configured to store at least one processing information PI. The storage circuit 270 may be a nonvolatile memory device, such as an e-fuse, a ROM, an EEPROM, and a flash memory, which can retain its stored data even when its power supply is interrupted. When the semiconductor memory device 200 enters an internal processing mode MODE_iP, the at least one processing information stored in the storage circuit 270 may be uploaded into the first area 211. Alternatively, the at least one processing information stored in the storage circuit 270 may be uploaded into the first area 211 for an idle time of the semiconductor memory device 200 or during a self-refresh period of the semiconductor memory device 200.

For example, referring to FIG. 13, in a step S310, the semiconductor memory device 200 may enter the internal processing mode MODE_iP.

In a step S320, the semiconductor memory device 200 may write processing information PI from the storage circuit 270 into the first area 211. In example embodiments, the processing information PI may include information for an internal processing operation of the semiconductor memory device 200 (command information or internal processing data information).

Then the semiconductor memory device 200 may perform operations of steps S330 and S340. The operations of the steps S330 and S340 are similar to the operations of the steps S130 and S140 in FIG. 6 or the operations of the steps S230 and S240 in FIG. 10 and will not be described in detail.

As described above, the semiconductor memory device 200 may further include a separate storage circuit 270 to store the processing information PI. When the internal processing mode MODE_iP is activated, the semiconductor memory device 200 may upload the processing information PI stored in the storage circuit 270 into the first area 211. Then the host 21 accesses the processing information PI stored in the first area 211, so the semiconductor memory device may perform the internal processing information.

Figure 14:
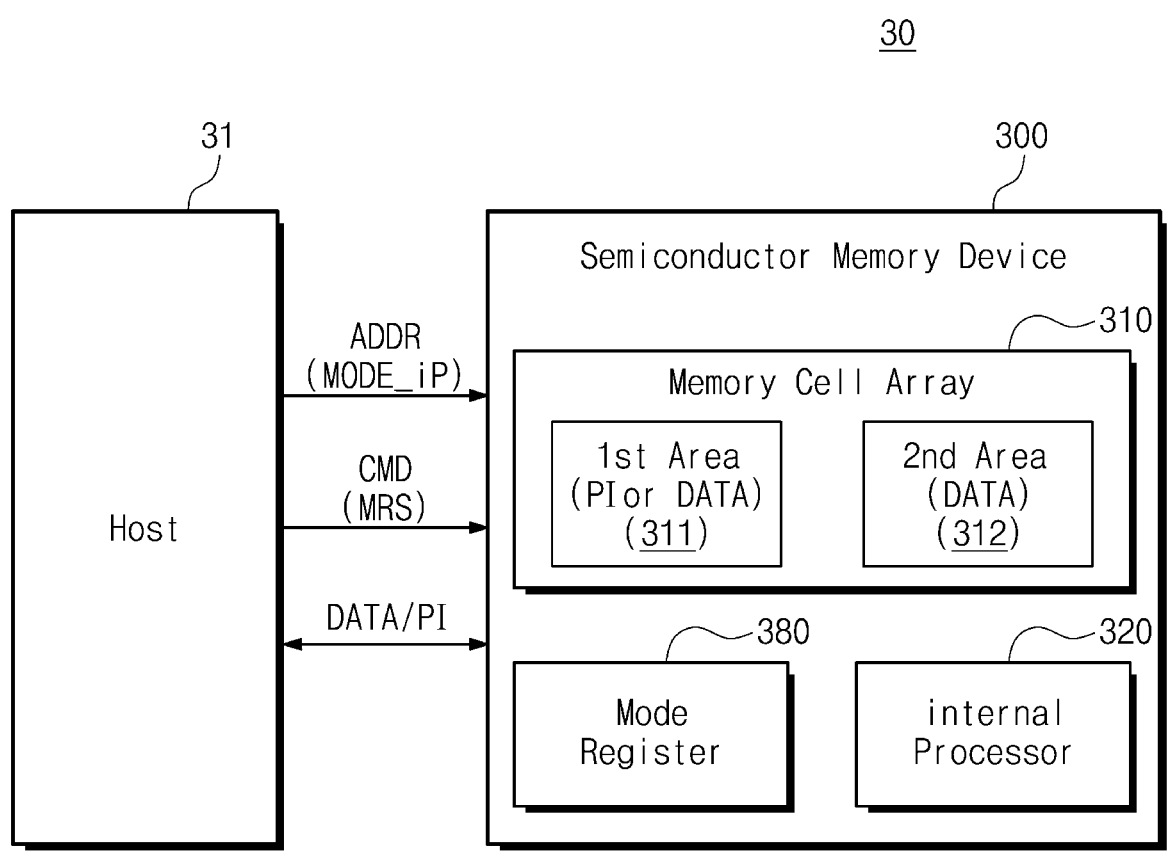
FIG. 14 is a block diagram of a user system according to example embodiments.
Figure 15:
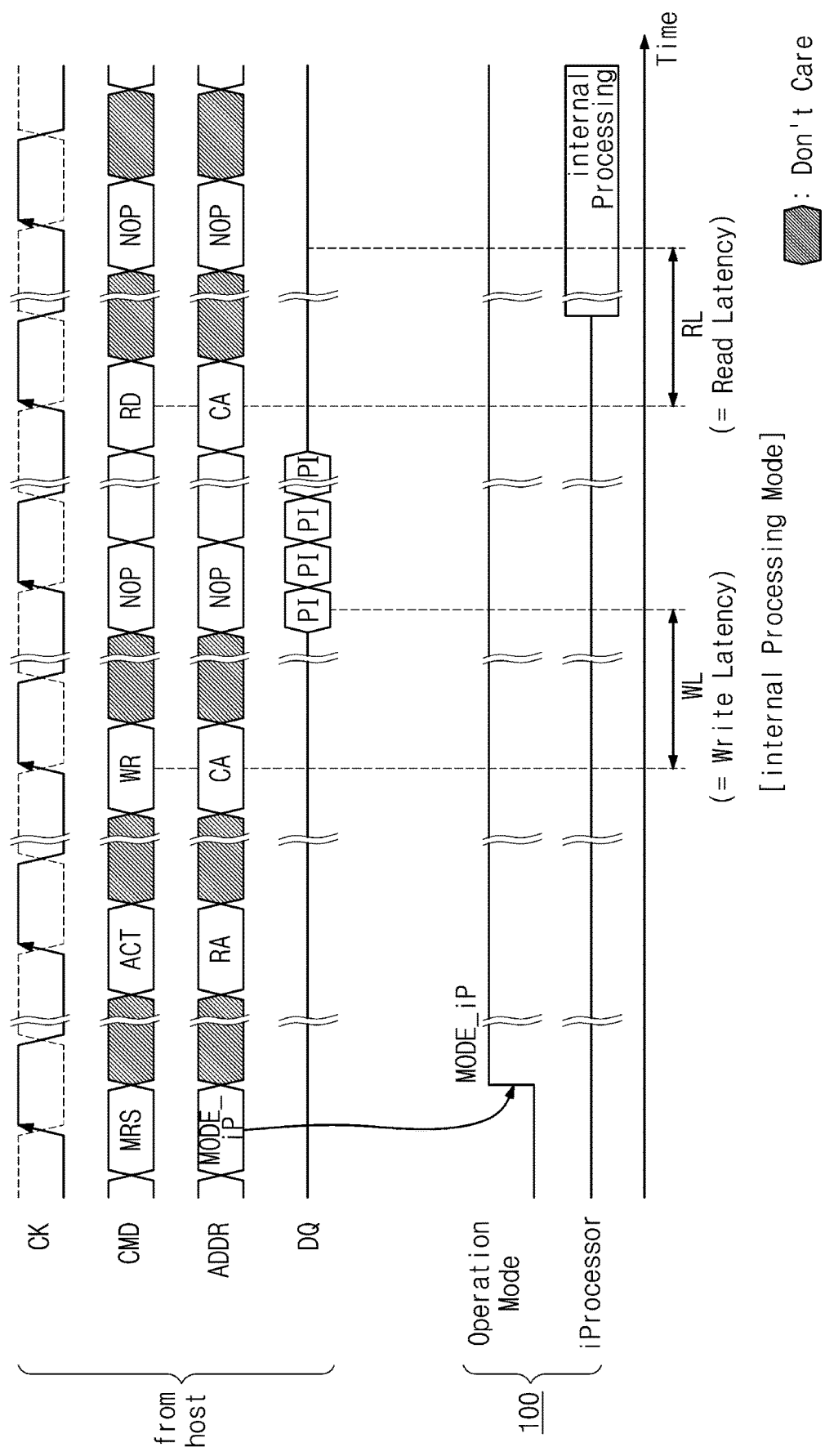
FIGS. 15 and 16 are timing diagrams summarizing operation of the semiconductor memory device in FIG. 14.
Figure 16:
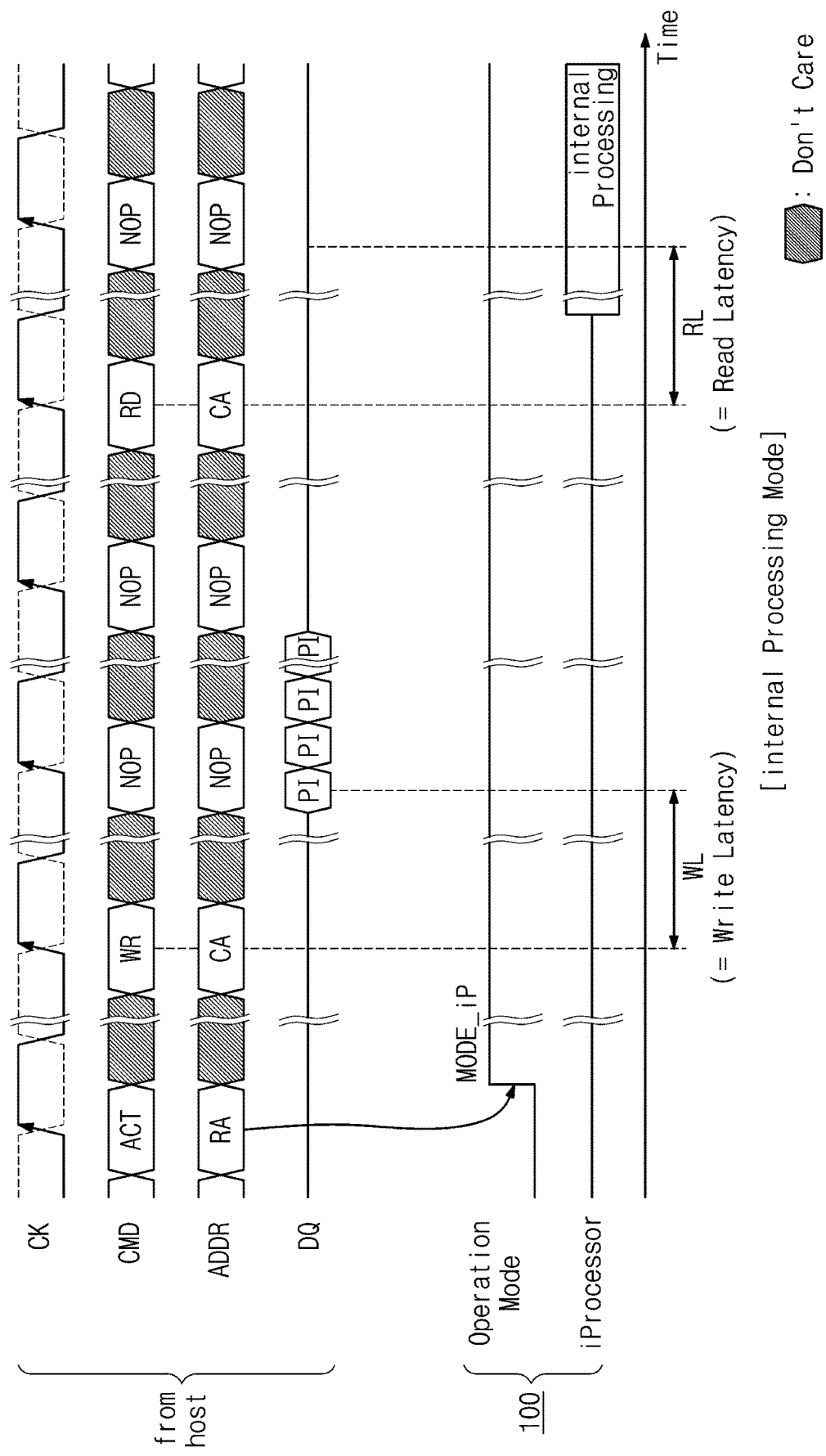

FIG. 14 is a block diagram of a user system 30 according to example embodiments of inventive concepts. FIGS. 15 and 16 are timing diagrams summarizing operation of the semiconductor memory device 300 in FIG. 14. Exemplary operations to activate an internal processing mode MODE_iP will be described with reference to FIGS. 14 to 16.

However, example embodiments of inventive concepts are not limited thereto. In addition, the exemplary operations to activate the internal processing mode MODE_iP may be incorporated into the above-described embodiments.

Referring to FIG. 14, the user system 30 includes a host 31 and a semiconductor memory device 300. The semiconductor memory device 300 includes a memory cell array 310, an internal processor 320, and a mode register 380. The memory cell array 310 includes a first area 311 and a second area 312. The host 31, the semiconductor memory device 300, the memory cell array 310, the internal processor 320, the first area 311, and the second area 312 have already been described and will not be described in detail.

The mode register 380 may include operation information of the semiconductor memory device 300. For example, the mode register 380 may include various information required to operate the semiconductor memory device 300, such as an operation mode of the semiconductor memory device 300 and a latency between signals.

The mode register 380 may be set under the control of the host 31. For example, the host 31 may transmit a mode register set (MRS) command for setting a mode register through a command line CMD and may transmit a code to be set to the mode register 380 through an address line ADDR. The semiconductor memory device 300 may set the code received through the address line ADDR to the mode register 380 in response to the mode register set (MRS) command from the host 31.

In example embodiments, the host 31 may activate the internal processing mode MODE_iP of the semiconductor memory device 300 using a mode register set MRS. For example, the host 31 may set a code for the internal processing mode MODE_iP to the mode register 380 using the mode register set MRS, and the semiconductor memory device 300 may enter the internal processing mode MODE_iP based on the code set to the mode register 380 (i.e., the code for the internal processing mode MODE_iP). In the internal processing mode MODE_iP, the semiconductor memory device 300 may perform an internal processing operation based on the operation method described with reference to FIGS. 1 to 13.

Referring to FIGS. 14 and 15, the semiconductor memory device 300 may receive the register set (MRS) command and the code for the internal processing mode MODE_iP. The semiconductor memory device 300 may set the code for the internal processing mode MODE_iP to the mode register 380 in response to the mode register set (MRS) command. The semiconductor memory device 300 may activate the internal processing mode MODE_iP based on the code set to the mode register 3800 (i.e., the code for the internal processing mode MODE_iP).

Then the semiconductor memory device 300 receives an active command ACT, a row address RA, a write command WR, and a column address CA from the host 31. The semiconductor memory device 300 receives the processing information PI from the host 31 after a predetermined time (i.e., write latency WL) has elapsed from a time point at which the write command WR is received. Then the semiconductor memory device 300 receives a read command RD and the column address CA. The semiconductor memory device 300 may perform the internal processing operation in response to the received signals.

As described above, in a normal mode MODE_n, when the read command RD is received, read data may be output after a predetermined time (i.e., read latency RL) has elapsed from a time point at which the read command RD is received. However, as shown in FIG. 15, when the internal processing operation is performed, a separate data transaction may not be performed after the predetermined time (i.e., read latency RL) has elapsed from a time point at which the read command RD is received.

The active command ACT, the row address RA, the write command WR, the column address CA, the processing information PI, the read command RD, and the column address CA have already been described with reference to FIG. 9 and will not be described in detail. In example embodiments, the write command WR or the read command RD from the host 31 may be selectively omitted, as described with reference to FIGS. 9 to 13.

Referring to FIGS. 14 and 16, the semiconductor memory device 300 may receive the active command ACT and the row address RA from the host 31. At this point, the semiconductor memory device 300 may enter the internal processing mode MODE_iP based on at least one bit of the row address RA.

For example, the row address RA may include a plurality of bits. The row address RA may be an address corresponding to a row included in the first area 311 of the semiconductor memory device 300. At least some of the plurality of bits of the row address RA may correspond to the first area 311 of the semiconductor memory device 300. For example, when a most significant bit (MSB) of the row address RA is "1", at least one of the rows of the first area 311 may be selected. In contrast, when the most significant bit (MSB) of the row address RA is "0", at least one of rows of the second area 312 may be selected. As a result, the fact that the most significant bit (MSB) of the row address RA is "1" may mean that the processing information PI is accessed (e.g., written or read). The semiconductor memory device 300 may enter the internal processing mode MODE_iP in response to at least one bit of the row address RA.

After the internal processing mode MODE_iP is activated, the operation of the semiconductor memory device 300 are similar to that described with reference to FIG. 9 or 15 and will not be described in detail.

Although the most significant bit (MSB) of the row address RA has been described as an example, example embodiments of inventive concepts are not limited thereto. For example, at least one bit of the row address RA may correspond to the first area 311. Alternatively, the memory cell array 310 may include a plurality of banks and the first area 311 may include some of the banks. In this case, the semiconductor memory device 300 may enter the internal processing mode MODE_iP in response to a bank address corresponding to a bank included in the first area 311.

According to the example embodiments described with reference to FIGS. 14 to 16, the semiconductor memory device 300 may enter the internal processing mode MODE_iP without a separate mode signal or a signal line for activating the internal processing mode MODE_iP. As such, interface variation for supporting the internal processing mode MODE_iP may be minimized.

Examples of activating the internal processing mode MODE_iP based on a mode signal MS (see FIGS. 8 and 9), a mode register set, an address combination, and the like have been described. In each of these situations, a mode indicator may be used to determine whether an address is for accessing the first area 311 or the second area 312. For example, the mode indicator may be in the form of a mode signal MS, a mode register set code, or one or more bits of an address string. In these cases, the same address bits may be used to access either the first area 311 or the second are 312 depending on the mode indicator. However, example embodiments of inventive concepts are not limited thereto and a semiconductor memory device may enter an internal processing mode based on various manners (e.g., a redundant command, a vendor command, a command combination, etc.).

Figure 17:
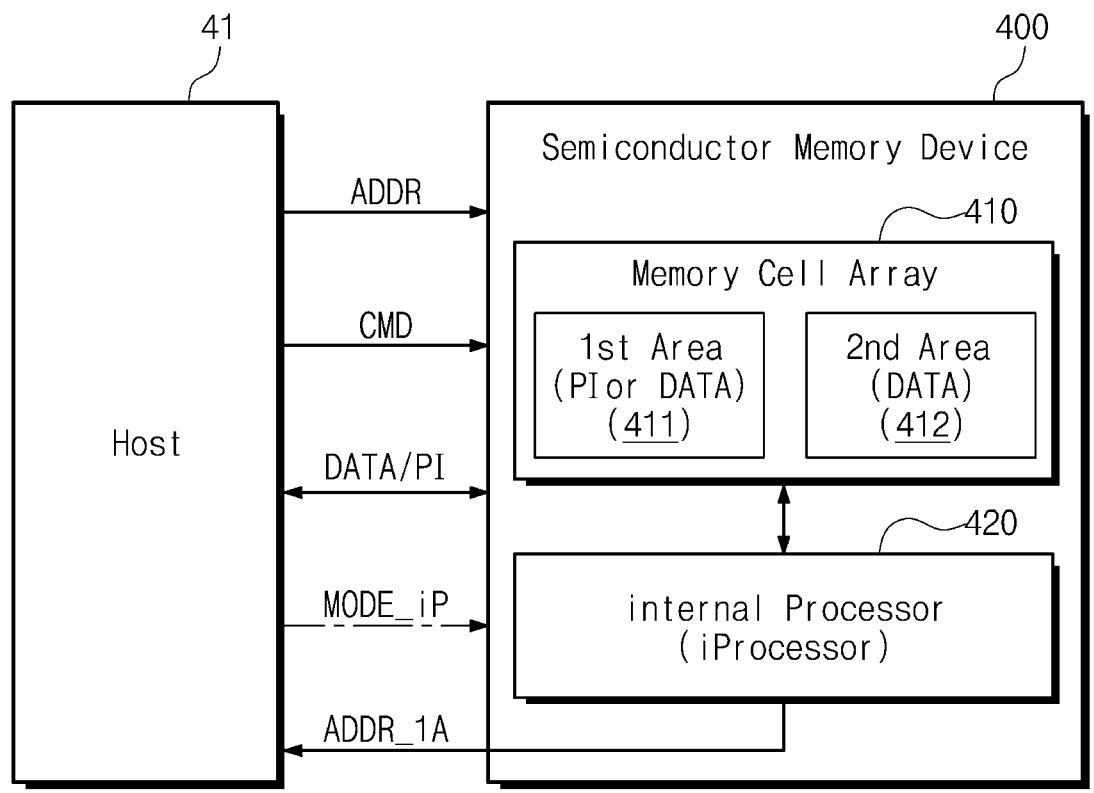
FIG. 17 is a block diagram of a user system according to example embodiments.

FIG. 17 is a block diagram of a user system 40 according to example embodiments. For brevity of description, detailed description of the above-described components will be omitted. Referring to FIG. 17, the user system 40 includes a host 41 and a semiconductor memory device 400. The semiconductor memory device 400 includes a memory cell array 410 and an internal processor 420. The host 41, the semiconductor memory device 400, the memory cell array 410, the internal processor 420, the first area 411, and the second area 412 are similar to those described above and will not be described in detail.

When an internal processing mode MODE_iP is activated, the internal processor 420 may provide address information ADDR_1A on the first area 411 to the host 41. For example, the first area 411 may be a variable area. That is, a logical address or a physical address of the first area 411 may vary each time the internal processor mode MODE_iP is activated. When the semiconductor memory device 400 enters the internal processing mode MODE_iP, the internal processor 420 may provide address information ADDR_1A on the first area 411 to the host 41 and the host 41 may write processing information PI into the first area or may access the processing information PI written into the first area 411 based on the received address information ADDR_1A.

In example embodiments, the address information ADDR_1A may include an address range for the first area 411 and information on the processing information PI stored in the first area 411. For example, the first area 411 may be a predetermined area (i.e., a fixed area). The first area 411 may include processing information PI used in a previous internal processing mode MODE_iP or processing information PI preloaded under a specific situation. The internal processor 420 may provide information on the above-described processing information PI to the host 41 as the address information ADDR_1A.

In example embodiments, the address information ADDR_1A may be provided to the host 41 through a data line DQ or a separate signal line I²C.

Figure 18:
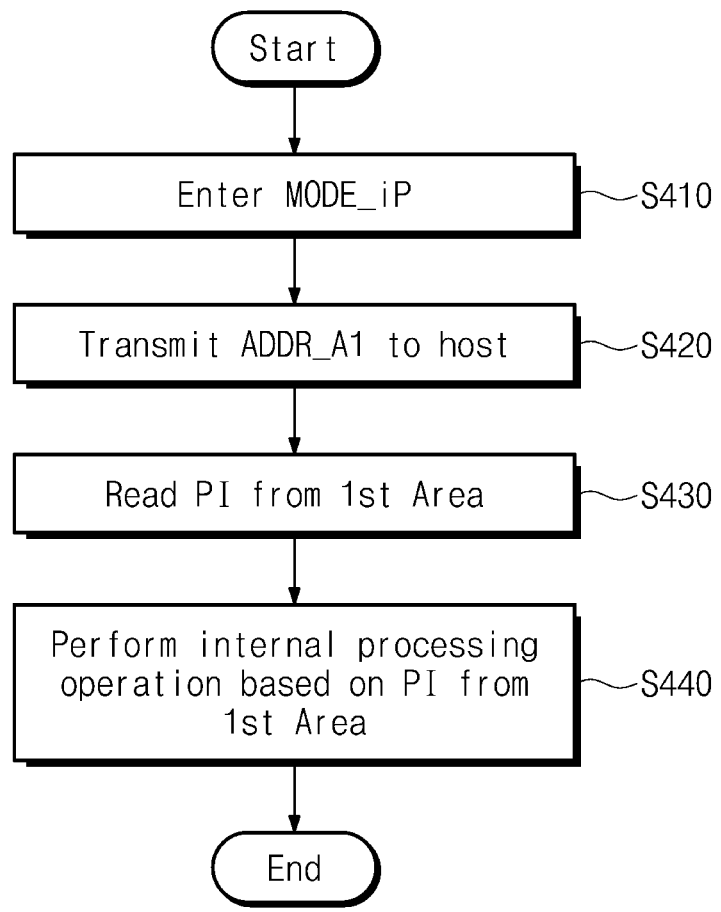
FIG. 18 is a flowchart summarizing operation of the semiconductor memory device in FIG. 17, according to example embodiments.
Figure 19:
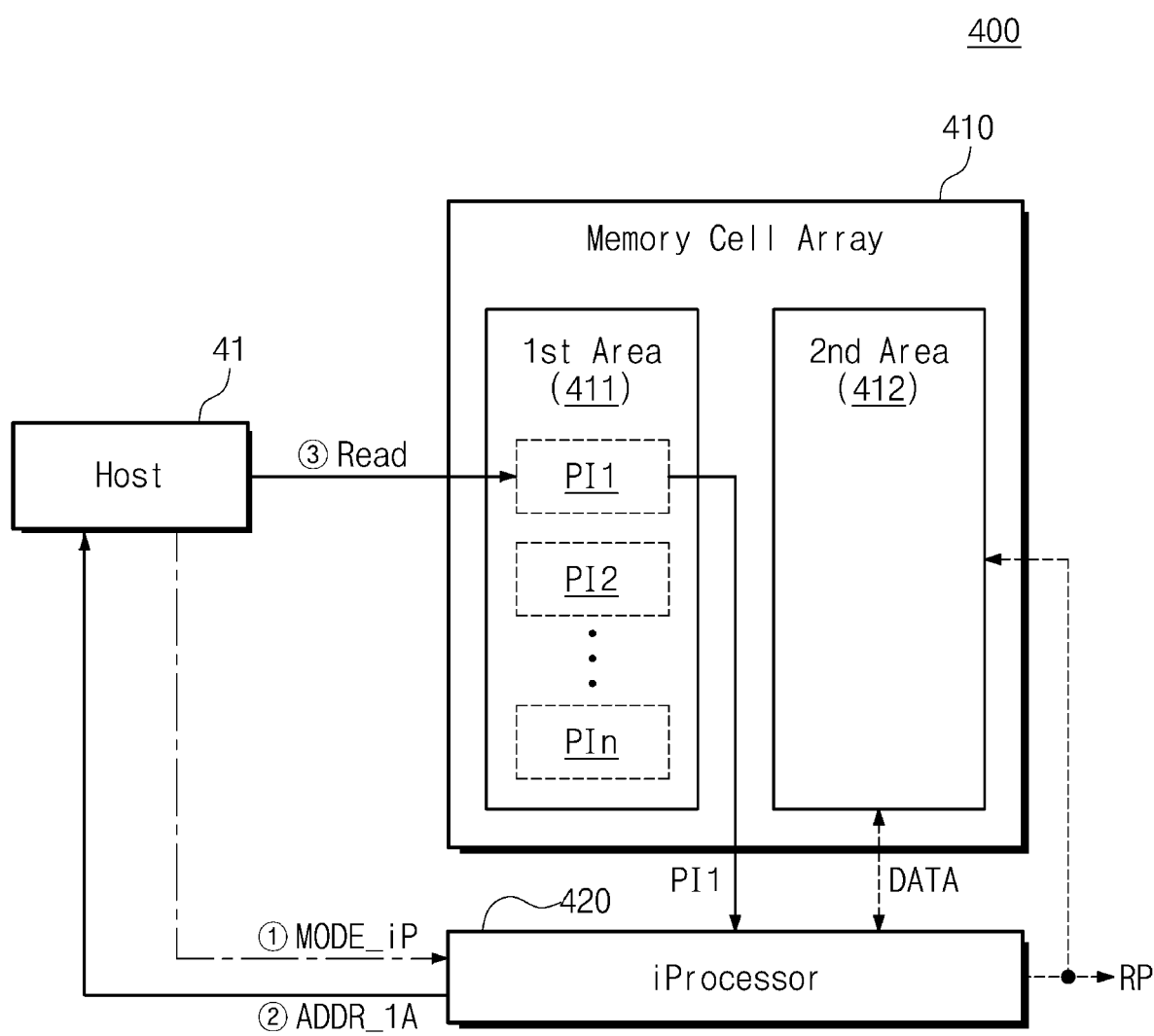
FIG. 19 is a block diagram to describe the operation in FIG. 18, according to example embodiments.

FIG. 18 is a flowchart summarizing operation of the semiconductor memory device 400 in FIG. 17, and FIG. 19 is a block diagram to describe the operation in FIG. 18. For brevity of description, components unnecessary to describe the operation in FIG. 18 will be omitted.

Referring to FIGS. 17 to 19, in a step S410, the semiconductor memory device 400 enters an internal processing mode MODE_iP (①in FIG. 19). An operation of the step S410 is similar to the operation of the step S110 in FIG. 6, the operation of the step S220 in FIG. 10, and the operation of the step S310 in FIG. 12 and will not be described in detail.

In a step S420, the semiconductor memory device 400 may transmit the address information ADDR_1A on the first area 411 to the host 41 (②in FIG. 19). For example, the first area 411 for storing the processing information PI may be a variable area. Like ② in FIG. 19, when the semiconductor memory device 400 enters the internal processing mode MODE_iP, the semiconductor memory device 400 may transmit the address information ADDR_1A indicating the range of the first area 411 to the host 41. In example embodiments, although not shown in the drawings, the address information ADDR_1A may be provided to the host 41 through the data line DQ or a separate communication line (e.g., I²C, etc.).

In a step S430, the semiconductor memory device 400 may read the processing information PI stored in the first area 411 (③in FIG. 19). For example, the first area 411 may include first to n$^{th}$ processing information PI1 to PIn. The first to n$^{th}$ processing information PI1 to PIn may be processing information used in a previous internal processing mode or processing information preloaded under a specific situation. The host 41 may access (i.e., read) processing information stored in the first area 411 (e.g., the first processing information PI1) based on the received address information ADDR_1A. The semiconductor memory device 400 may read the first processing information PI1 stored in the first area 411 under the control of the host 41.

Next, the semiconductor memory device 400 may perform an operation of a step S440. The operation of the step S440 is similar to the operation of the step S140 in FIG. 6, the operation of the step S240 in FIG. 10, and the operation of the step S340 in FIG. 12 and will not be described in detail.

In example embodiments, when the processing information PI is not stored in the first area 411, the host 41 may write the processing information PI into the first area 411 based on the received address information ADDR_1A. Then the semiconductor memory device 400 may perform the operation of the step S430.

According to the above-described embodiments, even when the first area 411 for storing the processing information PI varies, the internal processor 420 may provide the address information ADDR_1A to the host 41 to normally access the first area 411. In addition, when the processing information PI is written into the first area 411 in advance, the address information ADDR_1A may be provided to the host 41 to omit a write operation for writing the processing information PI. Thus, interface variation for supporting an internal processing operation may be minimized to improve performance of a semiconductor memory device and to reduce the costs of the semiconductor memory device.

Figure 20:
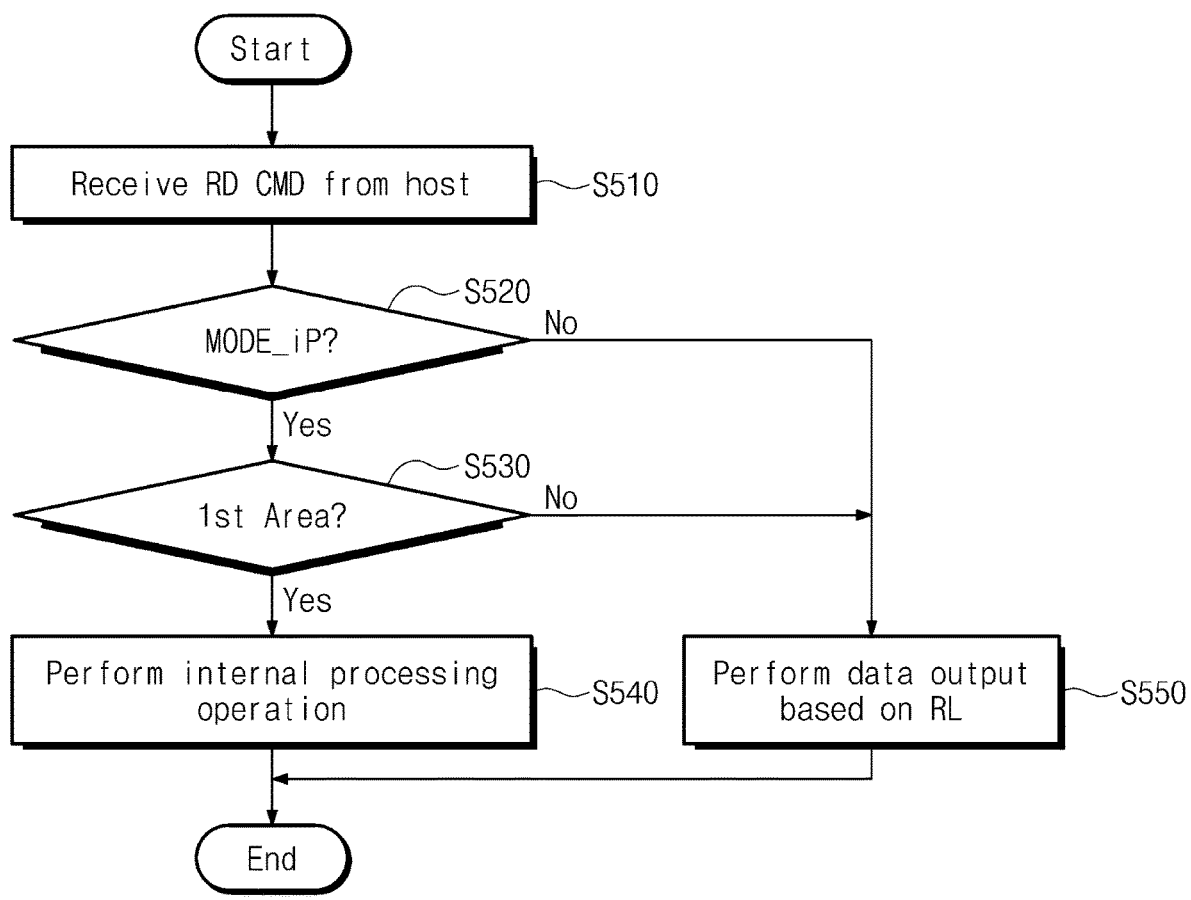
FIG. 20 is a flowchart summarizing operation of a semiconductor memory device according to example embodiments.

FIG. 20 is a flowchart summarizing operation of a semiconductor memory device according to example embodiments of inventive concepts. The operation of the semiconductor memory device in a normal mode and an internal processing mode will now be described with reference to FIG. 20.

Referring to FIGS. 1 and 20, in a step S510, the semiconductor memory device 100 may receive a read command RD CMD from the host 11.

In a step S520, the semiconductor memory device 100 may determine whether a current operation mode is an internal processing mode MODE_iP. For example, as described above, the semiconductor memory device 100 may operate in one of a normal mode MODE_n and the internal processing mode MODE_iP. As described above, the normal mode MODE_n indicates an operation mode in which a normal data transaction is performed under the control of the host 11. The internal processing mode MODE_iP may indicate an operation mode in which a data processing operation such as search of data stored in the semiconductor memory device 100, data add, data move, data swap, data process, and data operation is performed without control of a separate host 11. The normal mode MODE_n or internal processing mode MODE_iP may be determined, for example, based on a mode indicator that indicates whether the semiconductor memory device 100 should operate in a processing mode, also described as a processor mode, or in a normal mode. The mode indicator may be one of the various mode indicators described previously.

In the case of the internal processing mode MODE_iP, in a step S530, the semiconductor memory device 100 may determine whether the read command RD is a read command for the first area 111. As described above, the first area 111 is an area in which processing information PI for use in the internal processing operation is stored. The first area 111 may be, for example, a first memory cell region that is a redundant memory cell region that includes redundant memory cells. A first address may be used to store the processing information PI in the first memory cell region.

In the case that the read command RD is a read command for the first area 111, in a step S540, the semiconductor memory device 100 performs the internal processing operation based on the processing information PI read from the first area 111. The operation of the step S540 may be similar to that of the step S140 in FIG. 6.

In the case that the operation mode is not the internal processing mode (i.e., the operation mode is a normal mode) or the read command RD is not the read command for the first area 111 (i.e., the read command RD is the read command for the second area 112), in a step S550, the semiconductor memory device 100 may output data based on a read latency RL. For example, even when the semiconductor memory device 100 enters the internal processing mode MODE_iP, the semiconductor memory device 100 may perform a normal data transaction when the second area 112 (i.e., an area in which user data is stored) is accessed by the host 11. The second area 112 may be, for example, a second memory cell region that is a normal memory cell region including normal memory cells. A second address may be used to store the data in the second memory cell region. The first and second addresses described above may be the same address, and whether the first or second area 111 or 112 is accessed may depend on a mode indicator.

Although not shown in the drawings, when an access to the first area 111 occurs while the semiconductor memory device 100 operates based on the normal mode MODE_n, the semiconductor memory device 100 may perform the internal processing operation. For example, using the stored processing information, internal processing may be performed by an internal processor (e.g., 120, 220, 320, or 420) of the semiconductor memory device 100. In addition, a result of the internal processing can be stored in the memory cell array (e.g., in either the first area 111, 211, 322, or 411, or the second area 112, 212, 312, or 412). In one embodiment, storing processing information in the first memory cell region (e.g., first area 111) is performed in response to a write command.

As described herein, the first area 111 of memory cell array 110 may be a redundant memory cell array. In some embodiments, some redundant memory cell array entries can be used for redundancy, and others (unused ones) can be used for PI information. For example, a first address may be accurate in the normal cell array, so the redundant cell array for that address can be used for PI storage. A second address may be failed in the normal cell array, so the redundant cell array for that address can be used for redundancy (e.g., no PI storage).

In some embodiments, when in PIM mode, a first address is received and as a result, the PI is accessed in a redundant cell array based on first address. Then, when in normal mode, a first address is received and as a result, the regular data is accessed in a normal cell array based on first address. When in normal mode, and a second address is received, the redundant memory cell array may be accessed if the second address relates to an address that is failed in the normal memory cell array.

The mappings of failed and non-failed addresses can be determined using an address control circuit, for mapping the received addresses to the redundancy array. In one embodiment, the failed cells use fuses to map to the redundancy array, but the PI cells use an address control circuit (logic). In some embodiments, if there is no space left in the redundancy array, then the PI information can be stored in the normal cell array. For example, the space available in the redundancy array can be determined by keeping track of the number of redundant cells used for redundancy and separately keeping track of the number of rows of PI information stored in the redundancy array. If the number of rows of PI information stored in the redundancy array add up to the capacity of the redundant cell array, then the normal array may be used for subsequent PI information.

According to the above-described embodiments, a semiconductor memory device includes an internal processor that performs an internal processing operation. Additionally, the semiconductor memory device may store processing information for use in the internal processing operation in a specific area or an arbitrary area. In an internal processing mode, the internal processor may perform an internal processing operation based on processing information stored in the semiconductor memory device. At this point, since the semiconductor memory device performs the internal processing operation based on the processing information stored therein, the semiconductor memory device may perform the internal processing operation in response to a normal write or read command from a host. Conventional interface variation may be minimized to support the internal processing operation. Thus, performance of the semiconductor memory device may be improved and the cost of the semiconductor memory device may be reduced.

Figure 21:
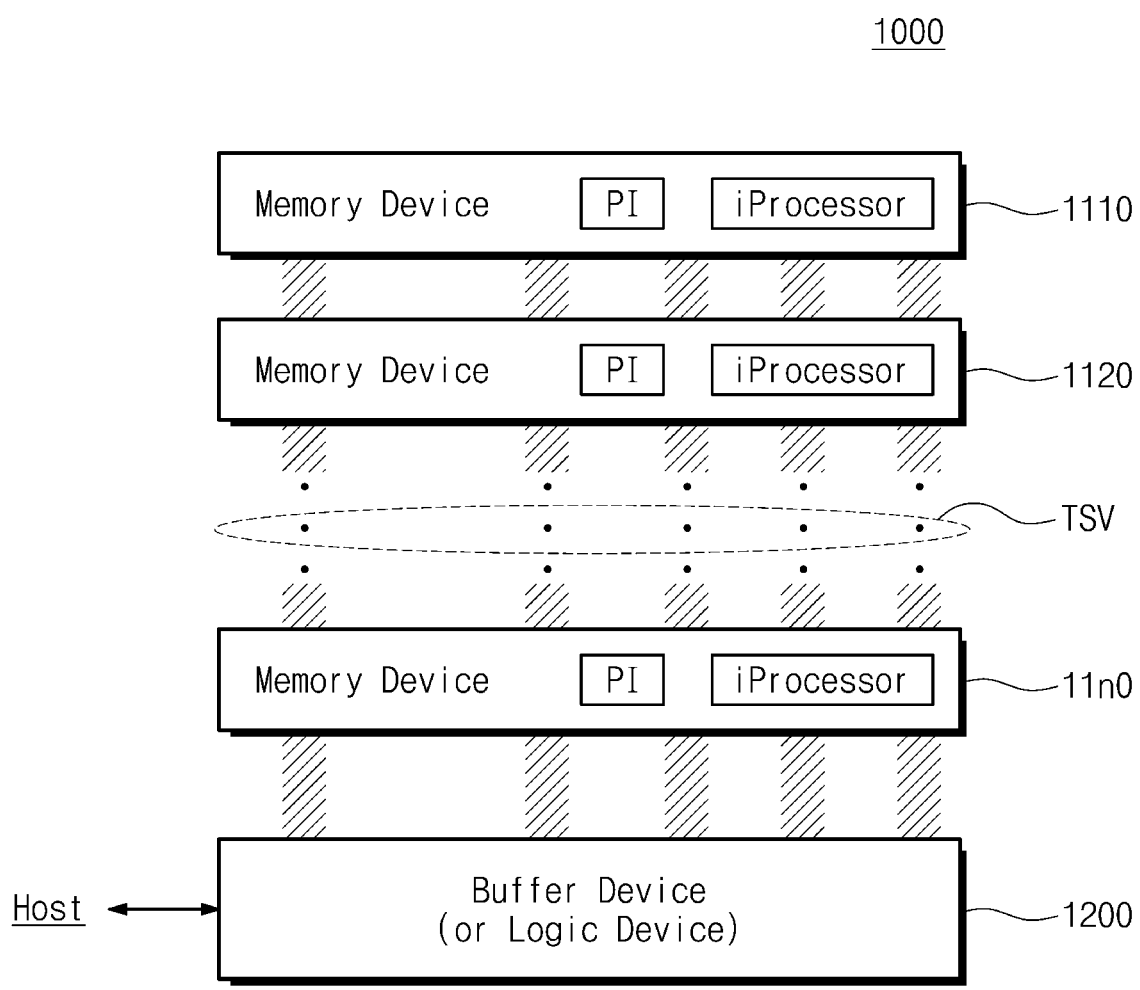
FIG. 21 is a block diagram of a memory package to which a semiconductor memory device according to example embodiments is applied.

FIG. 21 is a block diagram of a memory package 1000 to which a semiconductor memory device according to example embodiments is applied. Referring to FIG. 21, the memory package 1000 may include a plurality of memory devices 1110 to 11n0 and a buffer device 1200.

Each of the memory devices 1110 to 11n0 and the buffer device 1200 may include a separate semiconductor chip or die. Each of the memory devices 1110 to 11n0 may be connected to the buffer device 1200 through a through-silicon via (TSV) and may communicate with the buffer device 1200 through the TSV.

Each of the memory devices 1110 to 11n0 may include processing information PI and an internal processor (iProcessor). Each of the semiconductor memory devices 1110 to 11n0 may be a semiconductor memory device described with reference to FIGS. 1 to 20 and may operate based on the operation method described with reference to FIGS. 1 to 20.

The buffer device 1200 may communicate with a host. The buffer device 1200 may control each of the memory devices 1110 to 11n0 such that each of the memory devices 1110 to 11n0 operates based on the operation method described with reference to FIGS. 1 to 20.

In example embodiments, the buffer device 1200 may buffer signals provided from the host. Alternatively, the buffer device 1200 may be a logic device that processes the signals provided from the host and provides the processed signals to each of the memory devices 1110 to 11n0. In example embodiments, the semiconductor package 1000 shown in FIG. 21 may be a hybrid memory cube (HCM) or a high bandwidth memory (HBM).

Figure 22:
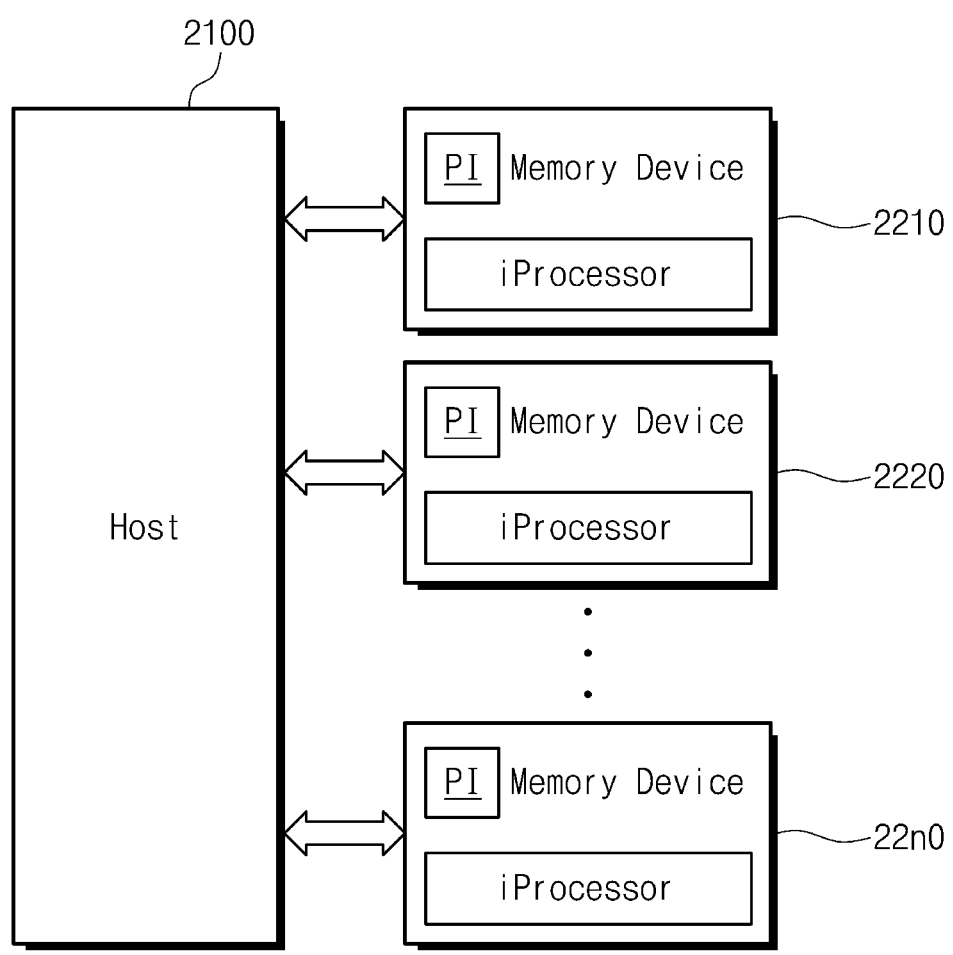
FIG. 22 is a block diagram of a user system to which a semiconductor memory device according to example embodiments is applied.

FIG. 22 is a block diagram of a user system 2000 to which a semiconductor memory device according to example embodiments is applied. Referring to FIG. 22, the user system 2000 may include a host 1100 and a plurality of memory devices 2210 to 22n0.

The host 2100 may write data into the memory devices 2210 to 22n0 or may read written data. In example embodiments, the host 2100 may control the memory devices 2210 to 22n0 based on the method described with reference to FIGS. 1 to 20 such that an internal processing operation is performed in each of the memory devices 2210 to 22n0.

Each of the memory devices 2210 to 22n0 may include processing information PI and an internal processor (iProcessor) and may be a semiconductor memory device described with reference to FIGS. 1 to 20.

Figure 23:
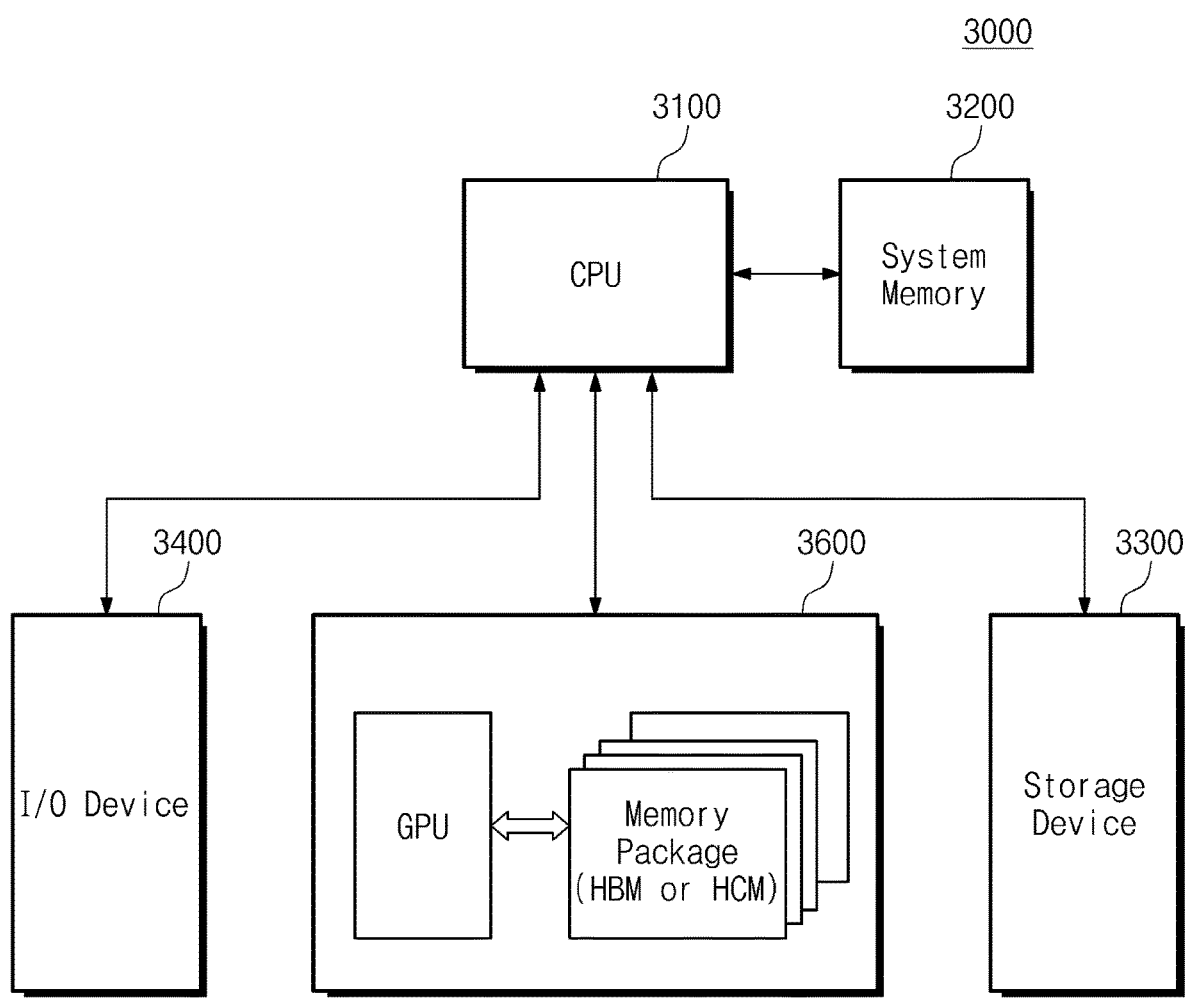
FIG. 23 is a block diagram of a user system to which a semiconductor memory device according to example embodiments is applied.

FIG. 23 is a block diagram of a user system 3000 to which a semiconductor memory device according to example embodiments is applied. Referring to FIG. 23, the user system 3000 includes a central processing unit (CPU) 3100, a system memory 3200, a storage device 3300, an input/output (I/O) device 3400, and a graphic device 3600.

The CPU 3100 may perform an instruction arithmetic operation, an instruction decoding operation or an instruction control operation. The system memory 3200 may be used as a buffer memory, a cache memory or a main memory of the CPU 3100.

The storage device 3300 may store data used in the user system 3000. The storage device 3300 may be implemented with a nonvolatile semiconductor memory device such as a phase-change RAM (PRAM), a magnetic RAM (MRAM), a resistive RAM (RRAM), a NAND flash memory, a NOR flash memory, and a three-dimensional NAND flash memory. The storage device 3300 may be a mass storage medium.

The I/O device 3400 may include devices that inputs data or a command to the user system 3000 or outputs data to an external device. In example embodiments, the I/O device 3400 may include user input interfaces such as a keyboard, a keypad, a button, a touch panel, a touch screen, a touch ball, a touch pad, a camera, a gyroscope sensor, a vibration sensor, and a piezoelectric element, a temperature sensor. In addition, the I/O device 3400 may include user output interfaces such as a liquid crystal display (LCD), an organic light emitting diode (OLED) display, an active matrix OLED (AMOLED) display, an LED, a speaker, and a motor.

The graphic device 3600 may a device for displaying an operation result of the CPU 3100. The graphic device 3600 may include a graphic processing unit (GPU) 3610 and a memory package 3620. The GPU 3610 may convert a data signal provided form the CPU 3100 into an image signal. The GPU 3610 may perform various arithmetic operations for graphic processing.

The memory package 3620 may be a buffer memory, a cache memory or a video memory that temporarily stores information required to perform an arithmetic operation. The memory package 3620 may include a plurality of memory devices. Each of the memory devices may be a semiconductor memory device described with reference to FIGS. 1 to 20.

According to the above-described embodiments, a semiconductor memory device may include an internal processor that performs an internal processing operation. In addition, the semiconductor memory device may include processing information for the internal processing operation. In an internal processing mode, the internal processor may perform an internal processing operation based on processing information accessed under the control of an external device (e.g., host). In this case, an operation to access the processing information may be similar to a write or read operation in a normal mode. In some embodiments, conventional interface variation for supporting the internal processing operation may be minimized to improve performance of a semiconductor memory device and to reduce the cost of the semiconductor memory device.

As described above, an internal processing operation may be performed by an internal processor in a semiconductor memory device to reduce a burden on an arithmetic operation of a host (i.e., external processor). Moreover, in some embodiments, interface variation for supporting the internal processing operation may be minimized to improve performance of a semiconductor memory device and to reduce the cost of the semiconductor memory device.

The above-disclosed subject matter is to be considered illustrative, and not restrictive, and the appended claims are intended to cover all such modifications, enhancements, and other features, which fall within the true spirit and scope of inventive concepts. Thus, to the maximum extent allowed by law, the scope of invention is to be determined by the broadest permissible interpretation of the following claims and their equivalents, and shall not be restricted or limited by the foregoing detailed description. While some example embodiments have been particularly shown and described, it will be understood by one of ordinary skill in the art that variations in form and detail may be made therein without departing from the spirit and scope of the claims.

What is claimed is:

1. A method for a processor-in-memory (PIM) device including a memory cell array and an internal processor, the method including:
receiving, at the PIM device, a first mode indicator that indicates whether the PIM device should operate in a processor mode or in a normal mode;
receiving, at the PIM device, processing information for the PIM device;
storing the processing information in a first memory cell region of the memory cell array;
receiving, at the PIM device, a read command from a host;
when the first mode indicator indicates that the PIM device should operate in the processor mode:
in response to the read command, accessing the stored processing information,
using the accessed processing information to perform internal processing by the internal processor, and
storing a result of the internal processing in a second memory cell region of the memory cell array; and
when the first mode indicator indicates that the PIM device should operate in the normal mode: in response to the read command, accessing first user data in the second memory cell region of the memory cell array, and outputting the first user data to the host,
wherein the internal processing is a processing operation on user data stored in the memory cell array prior to the first mode indicator being received, and
wherein the memory cell array is implemented as a single semiconductor chip.

2. The method of claim 1, wherein the first memory cell region is a redundant memory cell region.

3. The method of claim 1, further comprising:
receiving at the PIM device a second mode indicator that indicates whether the PIM device should operate in a processor mode or in a normal mode;
receiving at the PIM device a data signal including second user data; and
when the second mode indicator indicates that the PIM device should operate in the normal mode, storing the second user data from the data signal in the second memory cell region of the memory cell array.

4. The method of claim 3, wherein the first memory cell region is a redundant memory cell region and the second memory cell region is a normal memory cell region.

5. The method of claim 4, further comprising:
receiving at the PIM device a first address, and using the first address to store the processing information in the first memory cell region; and
receiving at the PIM device a second address, and using the second address to store the second user data in the second memory cell region.

6. The method of claim 5, wherein:
the first address is the same as the second address.

7. The method of claim 1, wherein the first mode indicator is one of: a command, an address bit, an MRS code, and a signal on a dedicated pin.

8. The method of claim 1, wherein using the stored processing information to perform the internal processing by the internal processor further includes:
transmitting the stored processing information from the first memory cell region to the internal processor to control internal processing by the internal processor.

9. The method of claim 1, further comprising:
when the first mode indicator indicates that the PIM device should operate in the processor mode, sending by the internal processor a signal for the memory cell array, which signal selects the first memory cell region.

10. A method for a processor-in-memory (PIM) device including a memory cell array and an internal processor, the method including:
storing user data in the memory cell array;
subsequent to the storing, receiving, at the PIM device, a first mode indicator that indicates whether the PIM device should operate in a processor mode or in a normal mode;
receiving and storing, at a first region of the PIM device, processing information for controlling an internal processing operation of the PIM device, the first region being a memory cell region of the memory cell array and the processing information received from a separate, second region of the PIM device, wherein the processing information includes a command;
in response to a read command received at the PIM device from a host, using the stored processing information to perform the internal processing operation by the internal processor; and
storing a result of the internal processing operation in the memory cell array,
wherein the internal processing operation is a processing operation on data stored in the memory cell array, and
wherein the memory cell array is implemented on a single semiconductor chip.

11. The method of claim 10, wherein the separate region of the PIM device is one of: a storage circuit; a register; and a fuse circuit.

12. The method of claim 10, wherein receiving and storing at the first region of the PIM device processing information for the PIM device is performed upon powering on the PIM device.

* * * * *